US008707458B2

(12) United States Patent
Malaney

(10) Patent No.: US 8,707,458 B2
(45) Date of Patent: Apr. 22, 2014

(54) LOCATION-ENABLED SECURITY SERVICES IN WIRELESS NETWORK

(75) Inventor: Robert Anderson Malaney, East Lindfield (AU)

(73) Assignee: Nariste Networks Pty. Ltd., Lindfield, NSW (AU)

( * ) Notice: Subject to any disclaimer, the term of this patent is extended or adjusted under 35 U.S.C. 154(b) by 1027 days.

(21) Appl. No.: 11/631,772

(22) PCT Filed: Jun. 20, 2005

(86) PCT No.: PCT/AU2005/000884
§ 371 (c)(1),
(2), (4) Date: Nov. 16, 2007

(87) PCT Pub. No.: WO2006/002458
PCT Pub. Date: Jan. 12, 2006

(65) Prior Publication Data
US 2008/0209521 A1    Aug. 28, 2008

(30) Foreign Application Priority Data
Jul. 7, 2004    (AU) ................ 2004903708

(51) Int. Cl.
H04L 29/00    (2006.01)
H04W 12/00    (2009.01)
G06F 21/00    (2013.01)

(52) U.S. Cl.
CPC .............. *H04W 12/00* (2013.01); *G06F 21/00* (2013.01)
USPC ................ 726/30; 726/26; 709/224; 702/150

(58) Field of Classification Search
CPC .................................................. H04W 12/00
USPC .............................. 726/26; 709/224; 702/150
See application file for complete search history.

(56) References Cited

U.S. PATENT DOCUMENTS 5,870,542 A * 2/1999 Ander et al. ............ 726/5
6,590,525 B2   7/2003 Yule et al.
(Continued)

FOREIGN PATENT DOCUMENTS

JP    2004-46666 A    2/2004
WO   WO 98/10307 A    3/1998
(Continued)

OTHER PUBLICATIONS

Conner, S, and Gryder, R, "Building a Wireless World with Mesh Networking Technology", Technology@Intel Magazine, Nov. 2003, pp. 1-6, (http://www.intel.com/update/departments/netcomm/nc11032.pdf).

(Continued)

*Primary Examiner* — Brandon Hoffman
*Assistant Examiner* — Michael D Anderson
(74) *Attorney, Agent, or Firm* — Ladas & Parry LLP

(57) ABSTRACT

A method (300), an apparatus (100), and a computer program product for providing location enabled security services in a wireless network are disclosed. In the method, a network access request from a node requesting access to the wireless network is received (304). A probability level for a position for the requesting node is calculated (310) using position information claimed by the requesting node and position information about the requesting node derived from signal measurements for the requesting node received by at least one existing authorized node in the wireless network. Access for the requesting node to the wireless network is denied (314) if the probability level does not satisfy a specified threshold condition for network security (312). Access for the requesting node to the wireless network is granted (318) if the probability level does satisfy the specified threshold condition (312).

52 Claims, 11 Drawing Sheets

(56) References Cited

U.S. PATENT DOCUMENTS

| | | | |
|---|---|---|---|
| 6,839,754 B2* | 1/2005 | Nowak et al. | 709/224 |
| 6,885,969 B2* | 4/2005 | Sahinoglu | 702/150 |
| 7,079,851 B2 | 7/2006 | Makuta | |
| 7,591,020 B2* | 9/2009 | Kammer et al. | 726/26 |
| 2002/0091956 A1 | 7/2002 | Potter et al. | |
| 2002/0094777 A1 | 7/2002 | Cannon et al. | |
| 2003/0083814 A1 | 5/2003 | Gronemeyer | |
| 2003/0100309 A1 | 5/2003 | Hull | |
| 2003/0107514 A1 | 6/2003 | Syrjarinne et al. | |
| 2004/0009778 A1 | 1/2004 | Makuta | |
| 2004/0190718 A1 | 9/2004 | Dacosta | |
| 2004/0267551 A1 | 12/2004 | Yadav | |

FOREIGN PATENT DOCUMENTS

| | | |
|---|---|---|
| WO | WO 02/076118 A | 9/2002 |
| WO | WO 02/088769 | 11/2002 |
| WO | WO 2004/004278 A | 1/2004 |
| WO | 2004/079499 | 9/2004 |

OTHER PUBLICATIONS

Ahmavaara, Kalle, Haverinen, Henry and Pichna, Roman, "Interworking architecture between 3GPP and WLAN systems", *IEEE Communications Magazine*, No. 11, Nov. 2003, pp. 74-81.

Karygiannis, T. And Owens, L., *Wireless Network Security*, National Institute of Standards and Technology, Special Publication 800-48, 2002 (http://csrc.nist.gov/publications/nistpubs/800-48/NIST_SP_800-48.pdf), entire document.

Koshima, H. and Hoshen, J., "Personal locator services emerge", *IEEE Spectrum*, vol. 32, No. 2, Feb. 2000, pp. 41-48.

Federal Communications Commission Enhanced 911 Report (http://www.fcc.gov/911/enhanced/), OET Bulletin No. 71, Apr. 12, 2000, pp. 1-12.

Bahl, Paramvir, and Padmanabhan, Venkata N., "RADAR: An In-Building RF-based User Location and Tracking System", In Proceedings of INFOCOM, 2000, pp. 775-784.

Ladd, A.M., Bekris, K.E., Marceau, G., Rudys, A., Wallach, D.S., and Kavraki, L.E., "Robotics-Based Location Sensing using Wireless Ethernet", In 8$^{th}$ ACM MOBICOM, Atlanta, GA, Sep. 2002, (http://citeseer.nj.nec.com/ladd02roboticsbased.html).

Patwari, Neal, Hero III, Alfred O, Perkins, Matt, Correal, Neiyer S, and O'Dea, Robert J, "Relative Location Estimation in Wireless Sensor Networks", IEEE Tran Signal Processing, vol. 51, No. 8, 2003, pp. 2137-2148.

S. Capkun, M. Hamdi, and J.-P. Hubaux, "GPS-free positioning in mobile ad-hoc networks", Proceedings of 34th IEEE Hawaii Int. Conf. on System Sciences (HICSS-34), Maui, Hawaii, Jan. 2001, 3481-3490, (http://citeseer.nj.nec.com/capkun01gpsfree.html).

Krumm, J., "Probabilistic Inferencing for Location", 2003 Workshop on Location-Aware Computing (Part of UbiComp 2003), Oct. 12, 2003, Seattle, WA, USA.

Location Enabled Networks, Newbury Networks White Paper 2003, *Wireless Security Perspectives* vol. 5, No. 3, Mar. 2003 (ISSN 1492-806X (print) published monthly by Cellular Networking Perspectives (http://www.newburynetworks.com/downloads/wsp0303.pdf).

Denning, Dorothy E., and MacDoran, Peter F., "Location-Based Authentication: Grounding Cyberspace for Better Security", In Computer Fraud & Security, Feb. 1996, Elsevier Science Ltd (http://www.cosc.georgetown.edu/~denning/infosec/Grounding.txt; see also http://www.gpsworld.com/gpsworld/article/articleDetail.jsp?id=57975&pageID=1).

Rappaport, T.S., Wireless Communications, Prentice Hall (New Jersey), 1999, pp. 123-131.

Van Diggelen, Frank, and Abraham, Charles, "Indoor GPS Technology", Presented at CTIA Wireless-Agenda, Dallas, May 2001, (http://www.globallocate.com/files/IndoorGPSTechnology.pdf).

Roberto Battiti, Mauro Brunato and Alessandro Villani, "Statistical Learning Theory for Location Fingerprinting in Wireless LANs Technical", Technical Report DIT 02-0086 Universita di Trento, Oct. 2002 (http://citeseer.nj.nec.com/battiti02statistical.html).

Royer, E., and Toh, C., "A Review of Current Routing Protocols for Ad Hoc Mobile Wireless Networks", IEEE Personal Communications, Apr. 1999, pp. 46-55.

J. Ziv and M. Zakai, "Some lower bounds on signal parameter estimation", *IEEE Trans. Inform. Theory*, vol. IT-15, No. 3, pp. 386-391, May 1969.

H.L. Van Trees, *Detection, Estimation, and Modulation Theory, Part I*. New York: Wiley, 1968, cover sheet and pp. 66-73.

Qualcomm's Assisted-GPS (A-GPS) technology. See Qualcomm/Snaptrack White Paper, *How A-GPS Works*, 2001, (http://www.snaptrack.com/pdf/How_aGPS_works.pdf).

Caffery, J., *Wireless Location in CDMA Cellular Radio Systems*, Kluwer Academic Publishers; Oct. 1, 1999, ISBN: 0792377036 (shortened version at http://citeseer.nj.nec.com/caffery98overview.html).

Sastry, Naveen; Shankar, Umesh; and Wagner, David, "Secure Verification of Location Claims", Proceedings of the 2003 ACM Workshop on Wireless Security, San Diego, CA, USA, 2003, pp. 1-10.

Malaney, R.A.: "A Location Enabled Wireless Security System", Global Telecommunications Conference, 2004. Globecom 2004. IEEE Dallas, Texas, USA—Nov. 29 -Dec. 3, 2004, Piscataway, New Jersey, USA, IEEE. vol. 4, Nov. 29, 2004, pp. 2196-2200.

Chow, C. Edward and Fong, Paul J.: "Secure Mobile Ad hoc Network (SMANET)"—A midterm report submitted to Network Information and Space Security Center (NISSC) for Summer 2003.

European Communication, Feb. 25, 2009—European Patent Office.

European Communication, Sep. 11, 2009—European Patent Office.

Chinese First Office Action dated Jul. 31, 2009—Chinese Patent Office and English translation of the same.

Chinese Second Office Action dated Apr. 22, 2010 and English translation of the same.

"Total revenue for data services in the U.K. market will grow 75 percent", Jun. 1, 2003, (http://www.cellular.co.za/news_2003/041303_uk_total_revenue_for_data_services.htm)

Roos, Teemu, et al., "A Statistical Modeling Approach to Location Estimation", *IEEE Transactions on Mobile Computing*, vol. 1, No. 1, Jan.-Mar. 2002, pp. 59-69.

Epstein, K, "How Geo-Encryption Makes Copyright Protection Global", CIO Insight Magazine, (http://www.cioinsight.com/print_article/0, 3668,a=24831,OO.asp), pp. 1-4, Apr. 1, 2002.

Indian Examination Report dated Nov. 20, 2012 for Indian Application No. 163/MUMNP/2007 (English version).

Japanese Notification of Reasons for Refusal dated Dec. 20, 2010 for Japanese Application No. 2004-4666.

espacenet English abstract of JP 2004-46666 A.

\* cited by examiner

LOCATION-ENABLED SECURITY SERVICES IN WIRELESS NETWORK

FIELD OF THE INVENTION

The present invention relates generally to wireless networks and more particularly to security in such wireless networks.

BACKGROUND

Security over wireless networks is a primary concern for many organisations and users utilizing wireless networks. Most effort on wireless security is in the well-established areas of encryption, distribution of keys, using an array of established techniques to avoid eavesdropping and attacks like denial of service.

Data, voice, and video communications in emerging wireless networks form a significant part of future e-commerce, transportation, and military systems. Some of these emerging wireless networks may be connected to other networks, through access points to either traditional wired networks or other wireless networks using differing technologies at the link layer. Some emerging wireless networks may include so-called mesh networks, where indirect routing to an access point via other nodes of the network is utilized for network-efficiency reasons. For example, see Conner, S, and Gryder, R, "Building a Wireless World with Mesh Networking Technology," Intel Technology Magazine, November 2003, pp. 1-6, (http://www.intel.com/update/departments/netcomm/nc11032.pdf). Some emerging wireless networks may include isolated ad-hoc networks (no access points), used for example at emergency sites, military zones, or within single transportation systems. Next generation mobile phone networks such as 3G are another form of wireless data network that are expected to be ubiquitous in the near future.

Wireless Local Area Network (WLAN) technologies, including the 802.11 architecture, are especially useful for local high-throughput situations. Networks based on such technologies can be readily deployed for commercial, military or emergency services. These WLAN technologies are well suited for situations where no pre-existing infrastructure exists, or has been destroyed, or is deemed to be insecure. While WLANs can be meshed together to form networks on the scale of kilometers, networks larger than this scale are most likely the domain of 3G. The seamless attachment of WLAN networks to next generation 3G wireless networks is also an intensive area of research. For example, see Ahmavaara, Kalle, Haverinen, Henry, and Pichna, Roman, "Interworking architecture between 3GPP and WLAN systems", *IEEE Communications Magazine*, No. 11, November 2003, pp. 74-81.

Security over emerging wireless networks remains a pivotal issue, consuming a large fraction of current research in the field. See Karygiannis, T., and Owens, L., *Wireless Network Security*, National Institute of Standards and Technology, Special Publication 800-48, 2002 (http://csrc.nist.gov/publications/nistpubs/800-48/NIST_SP_800-48.pdf).
Indeed, significant focus has been on the 802.11 architecture, with the IEEE 802.11i task group charged with enhancement of the base IEEE 802.1X protocol(s) in a WLAN. The task group aims to replace the easy-to-circumvent Wired Equivalent Privacy (WEP), with a layer 2 security specification for authentication and encryption of WLAN traffic.

Position location in wireless networks has attracted attention in the literature. See Koshima, H., and Hoshen, J., "Personal locator services emerge," *IEEE Spectrum*, Vol. 32, No. 2, February 2000, pp. 41-48. Such research has focused to some extent on development of positioning algorithms related to emergency (E-911) location of mobile handsets in GSM and 3G systems, to meet the mandated U.S. Federal Communications Commission (FCC) requirements of 50 m accuracy by 2003. See Federal Communications Commission Enhanced 911 Report (http://www.fcc.gov/911/enhanced/). Position location in other wireless networks, such as WLAN networks, does not fall within the FCC mandate. But as a consequence of the applicability of WLAN networks in a range of circumstances (not to mention their wide deployment as a consequence of inexpensive 802.11b cards) position location research in 802.11 WLAN networks is topical. See Bahl, Paramvir, and Padmanabhan, Venkata N, "RADAR: An In-Building RF-based User Location and Tracking System," In Proceedings of INFOCOM, 2000, pp. 775-784.

The positioning techniques deployed are dependent to a large extent on the operation of the underlying wireless network. In 802.11 networks, received signal-strength (RSS) measurements are often applicable. In practice, position technologies based on RSS measurements are susceptible to a host of environmentally induced errors. Interference, signal loss by obstructions, multi-path induced fading, and mobility effects are a few of the problems faced. In spite of this, accurate positioning can in fact occur in such systems. Accuracies of 2-3 meters are reported in the literature, with a recent study of robotic movement in building environments reporting 1.5 meter accuracy. See Ladd, A. M., Bekris, K. E., Marceau, G., Rudys, A., Wallach, D. S., and Kavraki, L. E., "Robotics-Based Location Sensing using Wireless Ethernet," In 8th ACM MOBICOM, Atlanta, Ga., September 2002, (http://citeseer.nj.nec.com/ladd02roboticsbased.html).

The most accurate RSS algorithms deploy a technique known as fingerprinting. In this method, the region over which the WLAN is deployed has a statistical database of the RSS expected from each access point (i.e., the fingerprint). The estimated position of the node in the network is usually associated with the point in the fingerprint providing the smallest Euclidean distance between the estimated position and the RSS signals from nearby access points.

In environments where no such fingerprint exists, such as in-the-field emergency or military deployment, the propagation method must be deployed. In this method, a mathematical model of the RSS as a function of distance in the anticipated environment is used. Triangulation, using three or more RSS measurements, is used to determine the position of the device. Although generally less accurate than the fingerprinting technique, propagation type models can be used to obtain useful position information. Recently, accuracies in range 5-10 meters were found using this method.

More detailed work on maximum-likelihood techniques for position location have been proposed, where RSS measurements between the nodes themselves are exploited. See Patwari, Neal, Hero III, Alfred O, Perkins, Matt, Correal, Neiyer S, and O'Dea, Robert J, "Relative Location Estimation in Wireless Sensor Networks", IEEE Tran Signal Processing, Vol. 51, No. 8, 2003, pp. 2137-2148. Also, even without any position information on nodes or access points, it has been recently shown how a useful relative position framework can be deployed. See S. Capkun, M. Hamdi, and J.-P. Hubaux, "GPS-free positioning in mobile ad-hoc networks," In 34*th IEEE Hawaii Int. Conf. on System Sciences* (HICSS-34), Maui, Hi., January 2001, 3481-3490, (http://citeseer.nj.nec.com/capkun01gpsfree.html).

Although introduction of mobility would seem problematic, some prior information on the probabilistic motion of a node can be exploited by recursive filter techniques to assist the position location algorithms. This may be done using an extended Kalman filter, a hidden Markov model approach, or a particle-filter approach. Particle filter approaches (essentially sequential Monte Carlo simulations of the a posterior position distribution function) appear to be superior. See Krumm, J., "Probabilistic Inferencing for Location," 2003 Workshop on Location-Aware Computing (Part of UbiComp 2003), Oct. 12, 2003, Seattle, Wash., USA. Location Aware Networks for security purposes have been proposed. See "Location Enabled Networks," Newbury Networks White Paper 2003, *Wireless Security Perspectives* Vol. 5, No. 3, March, 2003, (ISSN 1492-806X (print) published monthly by Cellular Networking Perspectives (http://www.newburynetworks.com/downloads/wsp0303.pdf). In such networks, the positioning ability of the wireless network itself is used to track unauthorized access points that appear within unauthorized areas for significant amounts of time.

GPS position location for security purposes has also been pursued, where GPS information is used directly in the encryption and decryption processes. See Denning, Dorothy E., and MacDoran, Peter F., "Location-Based Authentication: Grounding Cyberspace for Better Security," In Computer Fraud & Security, February 1996, Elsevier Science Ltd (http://www.cosc.georgetown.edu/~denning/infosec/Grounding.txt; see also http://www.gpsworld.com/gpsworld/article/articleDetail.jsp?id=57975&pageID=1). Even though the problem of making the encryption device and the GPS receiver tamperproof may not be completely solved, GPS encryption has gathered the interests of US commercial and military organisations. See Epstein, K, "How Geo-Encryption Makes Copyright Protection Global," CIO Insight Magazine, (http://www.cioinsight.com/print_article/0,3668,a=24831,00.asp).

Using position location for security purposes in wireless networks is an emerging field. However, a need clearly exists for a system where a wireless network calculates and delivers quantitative statistical probability levels associated with a node's security level based on its claimed position.

In accordance with yet further aspects of the invention, apparatuses and computer program products are provided for implementing each of the foregoing aspects of the invention.

SUMMARY

In accordance with an aspect of the invention, there is provided a method of providing location enabled security services in a wireless network. The method comprises the steps of: receiving a network access request from a node requesting access to the wireless network; calculating a probability level for a position for the requesting node using position information claimed by the requesting node and position information about the requesting node derived from signal measurements for the requesting node received by at least one existing authorised node in the wireless network; and denying access for the requesting node to the wireless network if the probability level does not satisfy a specified threshold condition for network security.

The method may further comprise the step of granting access for the requesting node to the wireless network if the probability level does satisfy the specified threshold condition.

The position information claimed by the requesting node, the position information about the requesting node derived from signal measurements, or both, may comprise Global Positioning System (GPS) information about the requesting node.

The position information claimed by the requesting node, the position information about the requesting node derived from signal measurements, or both, may comprise manually specified data for the respective node.

The signal measurements may comprise received signal strength (RSS) measurements, time of arrival (TOA) measurements, time-difference of arrival (TDOA), or angle of arrival (AOA) measurements.

The wireless network may be based on the IEEE 802.11 wireless-network architecture, or a 3G wireless network, or any other wireless technology.

The threshold condition for network security may be a weighted value, where the weight w applied is dependent upon a location-based parameter where the requesting node is unable to be located.

A node may comprise an electronic device capable of wireless communications in the wireless network.

The method may further comprise the steps of: maintaining a position history for the requesting node and each of one or more existing authorized nodes accessing the wireless network; and determining an updated position of the requesting node using the position information about the requesting node derived from the signal measurements for the requesting node received by the at least one existing authorised node in the wireless network and the position history for at least one of the requesting node and each such existing authorised node.

The method may further comprise the step of using the updated position of the requesting node as the actual position of the requesting node.

The determining step may be carried out using a filter technique. The filter technique may be a particle filter.

The method may further comprise the step of measuring by at least one access point of the wireless network fingerprint signal measurements about the requesting node. The method may further comprise the step of comparing the measured fingerprint signal measurements against a database of fingerprint signal measurements based on a standard wireless device. Position information about the requesting node may be determined based on a difference of fingerprint signal measurements for the requesting node measured by the at least one access point.

The measuring step may be performed by at least two access points.

In accordance with another aspect of the invention, there is provided a method of determining a secure routing path through a wireless network. The method comprises the steps of: determining local propagation parameters; determining either a standard error ellipse or a nuisance error ellipse at a claimed position of a node requesting access the wireless network; granting the requesting node and all existing authorised nodes of the wireless network broadcast privileges if a probability level for a position for the requesting node dependent on the error ellipse satisfies a specified threshold condition, the probability level calculated using claimed position information provided by the requesting node and position information about the requesting node derived from signal measurements for the requesting node received by at least one existing authorised node in the wireless network; and denying broadcast privileges to the requesting node and at least one existing authorized node within a hearing ellipse relative to the requesting node if the probability level for the position for the requesting node fails to satisfy the specified threshold condition.

The hearing ellipse may be located at a position for the requesting node determined by the wireless network.

The method may further comprise the step of setting the specified threshold condition.

The method may further comprise the step of determining if the local propagation parameters are reliable. The standard error ellipse or the nuisance error ellipse at the claimed position of the requesting node attempting to access the wireless network may be dependent upon the determination of the reliability of the local propagation parameters.

The method may further comprise the step of calculating the probability level for the position for the requesting node using the determined standard error ellipse or the determined nuisance error ellipse.

The method may further comprise the step of recalculating error ellipses centered at a radio position if the probability level for the position for the requesting node fails to satisfy the specified threshold condition.

The method may further comprise the step of choosing either a standard error ellipse or a nuisance error ellipse dependent upon the reliability of the local propagation parameters.

The method may further comprise the step of establishing the hearing ellipse based on a radio range and the perimeter of the chosen error ellipse.

In accordance with still other aspects of the invention, there are provided apparatuses and computer program products each embodying the respective method of one of the above aspects.

BRIEF DESCRIPTION OF THE DRAWINGS

Embodiments of the invention are described hereinafter with reference to the drawings, in which.

DETAILED DESCRIPTION

Figure 1:
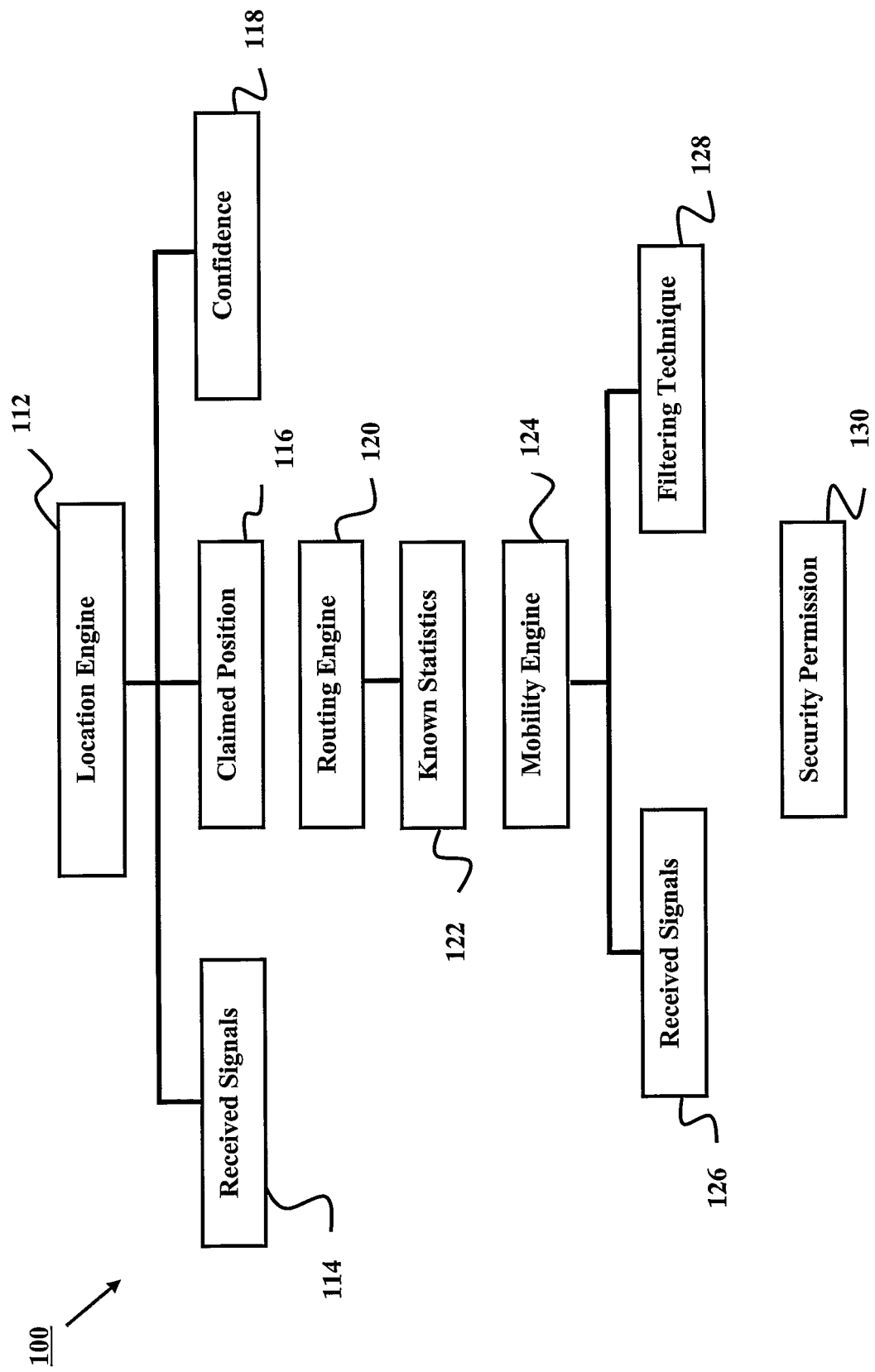
FIG. 1 is a block diagram of a location-enabled security service system in accordance with an embodiment of the invention, and of optional components including a routing engine module and a mobility engine module.

Methods, apparatuses, and computer program products for providing location enabled security services in a wireless network are described. Further, methods, apparatuses, and computer program products for routing data traffic in a wireless network are described. Still further, methods, apparatuses, and computer program products for tracking nodes in a wireless network are described. In the following description, numerous specific details, including particular wireless networks, positioning systems, network configurations, filtering techniques, and the like are set forth. However, from this disclosure, it will be apparent to those skilled in the art that modifications and/or substitutions may be made without departing from the scope and spirit of the invention. In other circumstances, specific details may be omitted so as not to obscure the invention.

The methods may be implemented in modules. A module, and in particular its functionality, can be implemented in either hardware or software. In the software sense, a module is a process, program, or portion thereof that usually performs a particular function or related functions. Such software may be implemented in C, C++, JAVA, JAVA BEANS, Fortran, or a combination thereof, for example, but may be implemented in any of a number of other programming languages/systems, or combinations thereof. In the hardware sense, a module is a functional hardware unit designed for use with other components or modules. For example, a module may be implemented using discrete electronic components, or it may form at least a portion of an entire electronic circuit such as a Field Programmable Gate Arrays (FPGA), Application Specific Integrated Circuit (ASIC), and the like. A physical implementation may also comprise configuration data for a FPGA, or a layout for an ASIC, for example. Still further, the description of a physical implementation may be in EDIF netlisting language, structural VHDL, structural Verilog, or the like. Numerous other possibilities exist. Those skilled in the art will appreciate that the system may also be implemented as a combination of hardware and software modules.

Some portions of the following description are presented in terms of algorithms and representations of operations on data within a computer system or other device capable of performing computations. Such algorithmic descriptions and representations may be used by those skilled in the art to convey the substance of their work to others skilled in the art. An algorithm is a self-consistent sequence of steps leading to a desired result. The steps are those requiring physical manipulations of physical quantities. Usually, though not necessarily, these quantities take the form of electrical, magnetic, or electromagnetic signals capable of being stored, transferred, combined, compared, and otherwise manipulated. These signals may be referred to as bits, values, elements, symbols, characters, terms, numbers, or the like.

The above and similar terms are to be associated with the appropriate physical quantities and are merely convenient labels applied to such quantities. Unless specifically stated otherwise, and as apparent from the following, discussions utilizing terms such as "receiving", "calculating", "granting", "denying", "setting", "requesting", "forwarding", "using", "accessing", or the like, refer to the action and processes of a computer system, or a similar electronic device. Such a system or device manipulates and transforms data represented as physical quantities within the registers and memories of the computer system into other data similarly represented as physical quantities within the computer system registers, memories, or another form of storage, transmission or display devices.

Apparatuses and systems for performing the operations of the methods are also described. Such an apparatus may be specifically constructed for the required purpose. Alternatively, the apparatus may comprise a general-purpose computer or another computing device (e.g., a PDA), which may be selectively activated or reconfigured by a computer program read by the computer. The algorithms presented herein are not inherently related to any particular computer or other apparatus; various general-purpose machines may be used with programs.

The embodiments of the invention also relate to a computer program(s) or software, in which method steps may be put into effect by computer code. The computer program is not intended to be limited to any particular programming language, operating environment, and implementation thereof. A variety of programming languages, operating systems, and coding thereof may be used. Moreover, the computer program is not intended to be limited to any particular control flow. There are many other variants of the computer program, which can use different control flows without departing the scope and spirit of the invention. Furthermore, one or more of the steps of the computer program may be performed in parallel rather than sequentially.

The computer program may be stored on any computer readable medium. The computer readable medium may comprise storage devices, such as magnetic media disks, CD-ROMs, DVDs, flash RAM devices, memory chips, memory cards, magnetic tape, other storage devices and media suitable for interfacing with and being read by a general-purpose computer, and combinations thereof. The computer readable medium may also include a hard-wired medium, such as a local area network or the Internet, or wireless medium, such as an IEEE 802.11 wireless network, a GSM mobile telephone system, PCS, and GPS. The computer program when loaded and executed on such a general-purpose computer effectively results in an apparatus that implements the method steps of the embodiments.

The methods of the embodiments comprise particular control flows. However, different control flows can be practised without departing from the scope and spirit of the invention.

I. Introduction

For many commercial and governmental organisations, security issues factor highest in the deployment decision process for wireless networks. The embodiments of the invention merge the concepts of wireless position location and wireless security in the context of emerging wireless networks. Location-positioning capabilities of a wireless network are exploited for security purposes to determine if a mobile network node (user) requesting access to the wireless LAN is in its proper location. A system is provided where the wireless network can calculate and deliver quantitative statistical probability levels associated with the requesting node's security level based on its claimed position. In accordance with an embodiment of the invention, a security system referred to as a Location Enhanced Security Service (LESS) complements existing encryption technologies with an additional layer of security. Hereinafter, a LESS system is described with reference to a wireless local area network (WLAN) using the 802.11 architecture. Another embodiment is described with reference to a 3G wireless network. However, other wireless networks may be practiced without departing from the scope and spirit of the invention. Given the wide availability of inexpensive wireless access cards and GPS cards, a person or organisation may deploy a LESS system in a cost-effective manner.

In most circumstances, malicious unauthorized nodes do not identify their true geographical position to the network for fear of apprehension. In the embodiments of the invention, a node uses its true position coordinates as a security enabler; the node's true position may be made seamlessly available to the node independently (e.g., by internal GPS acquisition or being manually specified). The wireless network is instructed to determine whether the position supplied by the requesting node is consistent with the network's own internal signal measurements. Return of low consistency implies that the requesting node may have tampered with its position identifier and likely represents a malicious threat. By identifying a statistical measure that the actual position claimed by a node is statistically very unlikely, that node may be blocked by the LESS system. Such a security system may operate even if the wireless network is under-determined and cannot solve for position unambiguously. This is a circumstance commonplace in wireless positioning systems.

The LESS system provides an addition to the security portfolio of wireless networks, again by using geographical position as a security enabler. The information received by the wireless network itself is used as a confirmation of a node's claimed position. This provides a reduced risk of (1) denial-of-service attacks, and (2) the blocking or tampering of routed traffic by a malicious user. The LESS system identifies any attempt by a node to tamper with GPS encryption techniques, as well as providing true positioning of the malicious node.

Devices utilising the LESS system may be embedded in a variety of networking technologies and topologies, from WLAN, mesh and ad hoc networks, through to much larger-scale systems such as 3G networks. The LESS system may be embedded in a stand-alone communications unit separate from the access points and nodes in the system, or may be embedded in one of the nodes or access points of the system.

The use of geographical position as a security enabler in wireless networks may be applied to routing as well, as described in greater detail hereinafter.

II. Overview of LESS System

For the purpose of discussion only, the WLAN described in this embodiment is assumed to be an emergency mobile ad hoc network operating over IEEE 802.11b architecture. Further, all nodes within such a system are assumed to be GPS enabled. Both IEEE 802.11b and GPS technologies are widely available in the form of inexpensive laptop cards. One problem with GPS access in mobile laptops or devices is one of battery consumption. GPS devices are known to consume significant levels of power, giving the mobile ad hoc network a short life span. However, in a wireless network, the GPS devices may be switched on for only a short time, or at periodic intervals, for tracking purposes.

In accordance with one embodiment of the invention, the LESS system receives received signal-strength (RSS) measurements from all nodes in the system and all relevant GPS positions (or other form of known location information). In wireless networks operating over 802.11b, the received signal strength (RSS) plays a significant role in determining the relative locations of mobile nodes. In other networks, time-of-arrival, time-differences-of-arrival, and angle-of-arrival measurements, for example, may be used.

From the wireless network's measurements and the claimed position information, the LESS system delivers a probability level associated with the new node's request to access the network (e.g. a measure that the requesting node is friendly. Based on this probability level, the LESS system makes a decision whether to allow or deny access. Again, the system is designed to complement existing security features and may be viewed as an additional component of security access. Architecturally, the LESS system may build on top of existing wireless security measures, and be used or overridden at the network operator's command.

FIG. 1 is a logical view of a location enabled security service (LESS) system 100 comprising several logical blocks. The system 100 comprises a location engine module 112 and a security permission module 130. The location engine module 112 determines probability levels. Once these are determined, the security permission module 130 uses these values to compare them with a specified threshold value T to make decisions. The security module 130 performs steps 312 of FIG. 3 and subsequent arrows, while the location engine module 112 performs the steps before 312 of FIG. 3. In the LESS system 100, only the top branch (the location engine 112) of FIG. 1 may be deployed.

The location engine module 112 utilises as inputs received signals 114 from verified nodes (i.e. existing, authorized nodes) and a claimed position 116 of the requesting node. The location engine module 112 ascertains a security probability level 118 associated with the node requesting access to the network from the noted inputs. Since the depicted scenario is for an ad hoc network, a triangulation method using an adopted propagation model is discussed. The propagation model is a mathematical relation that describes how the signal weakens as a function of distance.

In a straightforward example of how the location engine module operates, the Cramer-Rao bounds on a wireless system in a 100-meter-by-100-meter area may be calculated, from which probability levels 118 may be constructed. Further details of this calculation are provided hereinafter. Although larger areas are envisaged (e.g., small ad hoc networks coupled together with an architecture allowing for all RSS measurements to be routed back to a single processing point), the principles discussed are the same for larger scales.

Figure 2:
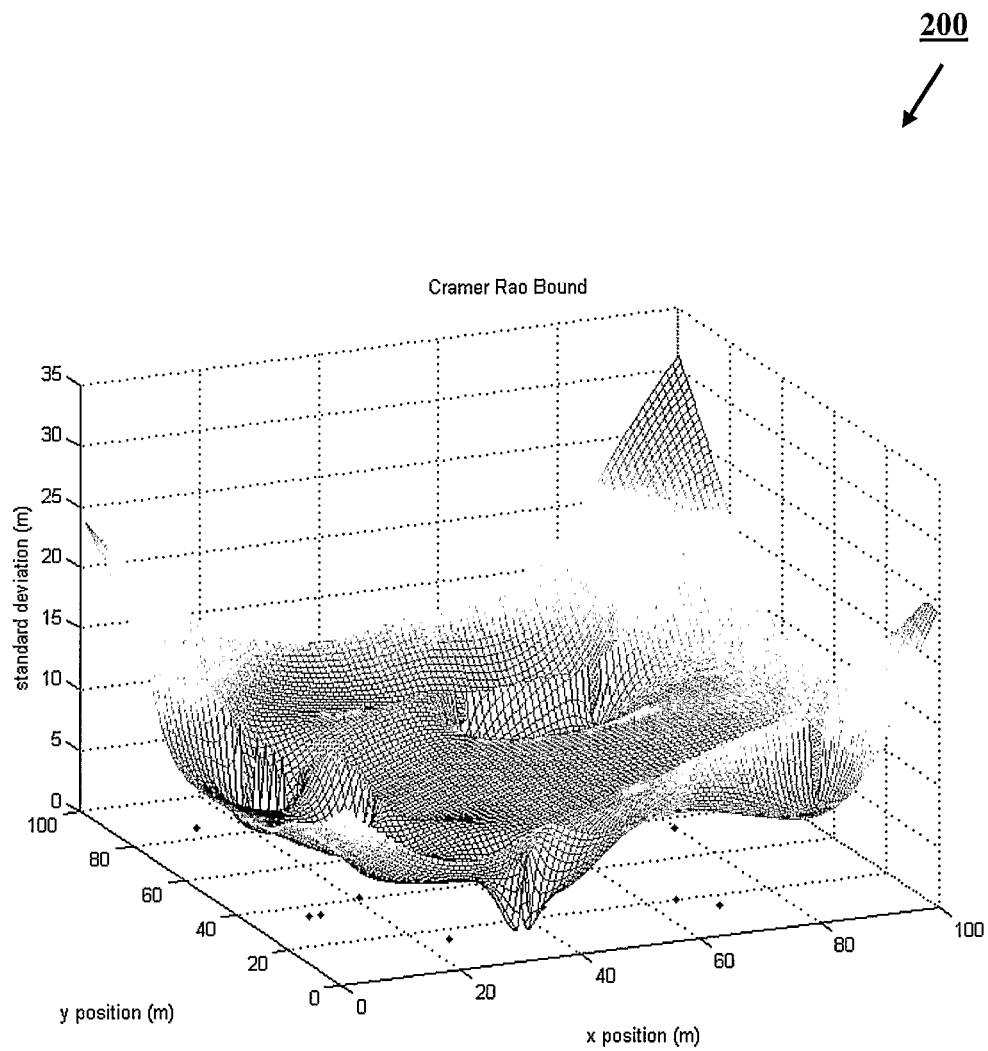
FIG. 2 is a plot of Cramer-Rao bounds in a ten-node ad hoc network.

Assume that a (potentially malicious) node requesting access possesses line-of-sight communications between ten different nodes already with access to the network. Adopting a typical log-normal propagation model appropriate for outdoor environments, the results of the calculation 200 are shown in FIG. 2. On the bottom plane of the plot, the actual locations of the ten existing, authorized nodes are shown. As can be seen, the minimum standard deviation on the position of a node within this system has a range of typically 5-25 meters, with the largest error occurring at the sparse network edge (for higher node density, the accuracy increases).

In a typical exchange within the location engine 112, the system 100 may ask for a probability level 118 of a malicious user, actually at grid point {0, 0}, claiming to be at grid point {100, 100} 116. The location engine 112 finds that the best estimates of the user's actual position are near the origin. More importantly, the location engine module 112 concludes that the requesting node is far away from its claimed position 116. The location engine 112 thus returns a small probability level 118 that this request is from an authorized node with potentially friendly intent.

If S is less than the specified threshold condition T for network security, access is denied. Upon detection of an unauthorised node, the network administrator may then take additional steps to block access, isolate the unauthorised node in the network (by blocking all traffic from nodes in his vicinity), or send investigators to the node's locale.

Additional complications could be expected in more general situations. In general, propagation models may be affected by obstructions. Attempts to account for such effects through use of absorption coefficients in the propagation model are known. See Rappaport, T. S., *Wireless Communications*, Prentice Hall (New Jersey), 1999, pp. 123-131. This technique has been useful if knowledge about the obstruction is available (e.g. brick wall). In general, however, knowledge of the obstructing material is unavailable. When GPS positioning at nodes is available, one may estimate dynamically the appropriate absorbing factors to be applied within the location engine 112 (adjust absorbing factor so the RSS measurements agree with ranges of authorised nodes). Such factors are local and directional, but may be applied to claimed positions 114 in a systematic way. One may then calculate the expected RSS 114 that at least one existing authorised node should expect to measure from an unauthorised node at its claimed position 118. This information may then be compared with what the wireless system actually detects. A probability level 118 based on this information may then be forthcoming.

While an outdoor emergency ad hoc network has been depicted, in a traditional indoor WLAN network, the location engine 112 confronts significantly different problems. In general, GPS acquisition is unavailable indoors—although indoor GPS solutions using large scale correlations are actively being promoted to solve this issue. See van Diggelen, Frank, and Abraham, Charles, "Indoor GPS Technology", Presented at CTIA Wireless-Agenda, Dallas, May 2001, (http://www.globallocate.com/files/IndoorGPSTechnology.pdf).

If no GPS is available, a different form of position ID is required, such as manually entering a label marker in the office. The location algorithms in this case may be on a fingerprinted system derived from previous RSS measurements of the building under question. In principle, similar procedures to those outlined above apply, except that the probability limits derived are based on some algorithm related to minimum Euclidean distances within the fingerprint. However, formal error analysis techniques no longer apply due to the presence of non-standard error distributions at different regions of the fingerprint. Statistical learning machine approaches have been formally applied to the position-location problem for interior fingerprint systems. See Roberto Battiti, Mauro Brunato, and Alessandro Villani, *Statistical Learning Theory for Location Fingerprinting in Wireless LANs* Technical Report DIT 02-0086 Universita di Trento, October 2002, (http://citeseer.nj.nec.com/battiti02statistical.html). To derive meaningful probability levels associated with fingerprints, similar techniques must be applied. Robust probability limits clearly identifying malicious nodes inside, and in the vicinity, of the building may be developed using this technique.

The paradigm of mobile wireless networks envisages the possibility of meshed networks and ad hoc networks over large scales. In such networks, even though a node cannot connect directly via a single hop to the majority of other nodes in the network, an indirect connection still exists via routing through multiple single-hop connections. In these circumstances, a proper routing scheme must be deployed. Routing in ad hoc and mesh networks continues as a field of ongoing research. See Royer, E., and Toh, C., "A Review of Current Routing Protocols for Ad Hoc Mobile Wireless Networks," IEEE Personal Communications, April 1999, pp. 46-55. However, routing algorithms based exclusively on security issues are not common. In an embodiment of the invention, such a routing scheme is proposed. This scheme is based partly on the probability levels 118 calculated for those nodes previously allowed into the network (i.e. existing, authorized nodes).

The LESS system 100 may comprise other optional components including a routing engine module 120, or a mobility engine module 124 (and their daughter modules), or both, as add ons. However, the LESS system 100 may operate without these. Each of these modules 120, 124 is described in greater detail hereinafter. The routing engine module 120 is a separate module that is optional. If the location engine module 112 and comparison with the Threshold indicate a malicious node being present, the routing engine module 124 may be deployed. The mobility engine module 124 improves the accuracy of the radio position (of the requesting node) determined by the network. The wireless network provides a radio position with or without the mobility engine module 124. This mobility engine module 124 is an optional module, which can in some cases (e.g., nodes are moving) help with a better determination of the radio position. This is described in greater detail hereinafter.

III. Process for Granting/Denying Access

Figure 3:
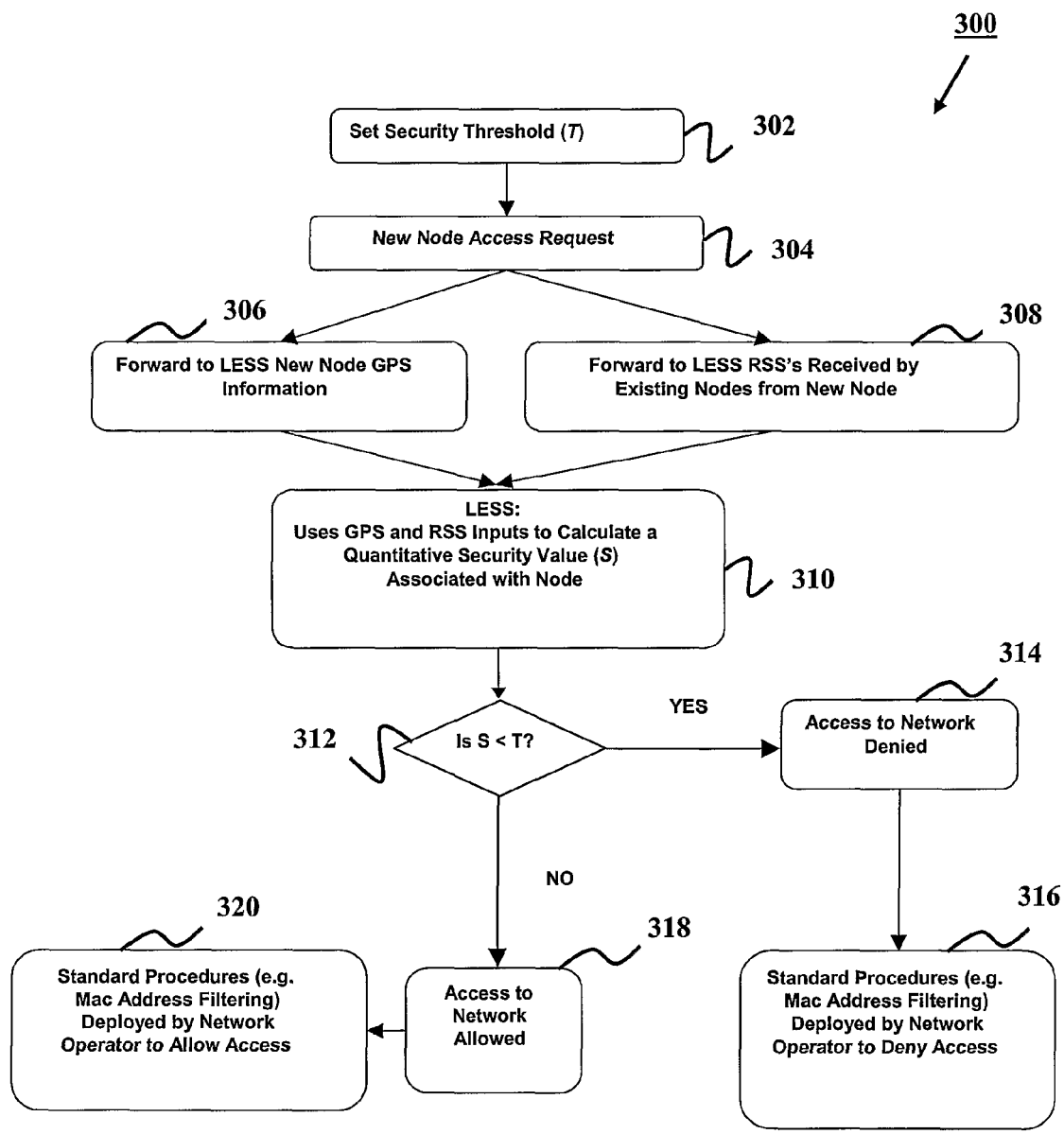
FIG. 3 is a flow diagram illustrating a process of providing location-enabled security services.

FIG. 3 is a flow diagram of a process 300 for providing location enabled security services granting or denying access to the wireless network in accordance with an embodiment of the invention. In step 302, a security threshold (T) is set for the wireless network. The threshold is simply chosen a priori by the network operator. Its significance and relation to error ellipses is described hereinafter. In step 304, a node requests access to the wireless network. In step 306, GPS information about the location of the node requesting access is forwarded by that node to the LESS system (i.e., a server somewhere). This may be done via intermediate nodes in the wireless network if the server is out of direct radio range of the requesting node. In step 308, received signal strength (RSS) measurements for the node requesting access are forwarded by any existing nodes (i.e. at least one existing, authorized node) in the wireless network, which receive signals from the requesting node. Any existing, authorized node receiving signals from the new node that is requesting access should forward the RSS. Even if only one node has an RSS, that is still useful information for consistency checking. Three nodes are required for more precise position location. Steps 306 and 308 may be performed in parallel, sequentially, or as a single step.

In step 310, the LESS system uses the GPS information and the RSS inputs to calculate a probability level or quantitative security value (S) associated with the node requesting access to the wireless network. The value of S may be based on the use of theoretical Cramer-Rao Bounds internally calculated by the LESS system. This system uses the GPS positions of the verified nodes in the wireless network to determine the Cramer-Rao bound and associated Error Ellipse on the position of the requesting node. Details of this step are set forth in detail hereinafter. The claimed GPS position of the requesting node is then compared with the error ellipse to set a probability level that the node is in a position consistent with claimed GPS position.

In decision step 312, a check is made to determine if the probability level S is less than the specified security threshold T. If step 312 returns true (YES), processing continues at step 314. In step 314, access to the network is denied, and the requesting node is identified as a potential malicious user (this is important for secure routing). In step 316, one or more procedures may be deployed by the network operator to deny access. The procedures may be standard ones, such as Mac Address Filtering. Processing then terminates. Otherwise, if step 312 returns false (NO), processing continues at step 318. In step 318, the node requesting access is granted access to the wireless network. In step 320, one or more procedures may be deployed by the network operator to allow access. One standard procedure is Mac Address Filtering. Processing then terminates.

IV. Setting Security Probability Levels

The embodiments of the invention enable a network operator to set security probability levels. This provides the operator with the ability determine in a quantitative and dynamic manner the level of security the operator wishes to assign to his network. The LESS system 100 even allows the operator to set different quantitative security levels to different nodes within the network. This quantitative security is also extensible to data routing within a wireless network. The ability to set quantitative security levels is based on the seamless embedment of detailed and formal error ellipses.

The distance of a potentially malicious node from the edge of such an error ellipse (e.g., how many standard deviations away from the edge is the claimed position) is a principal underlying the LESS system 100. As such, outlined hereinafter is how the LESS system 100 formally determines such ellipses, and how this information is utilized by the LESS system 100.

The notion of error ellipses derived from the Fisher Information Matrix (FIM) forms a part of deriving formal error ellipses. The FIM can be written:

$$J_{kl} = -E\left[\frac{\partial^2 \ln f(S)}{\partial \theta_k \partial \theta_l}\right], \quad (1)$$

where E represents the expectation operation, $f(S)$ represents the distribution function for a signal strength S, and $\vec{\theta} = (\theta_r, \theta_{r+1}, \ldots \theta_p)$ represents the vector of unknowns about which knowledge is sought. In the presence of p unknowns, the matrix above is a p×p square matrix. In this representation, the first two unknowns of $\vec{\theta}$ represent the quantities that are to be estimated, namely the 2-dimensional (2D) position coordinates of a node. The remaining terms of $\vec{\theta}$ represent the so called nuisance parameters (i.e., parameters influencing the estimates of the 2D position, but actual knowledge of which is not required).

From the FIM of Equation (1), the 2×2 covariance matrix on the x and y position of a node in the two dimensional plane can be derived:

$$v_{pos} = P J_{kl}^{-1} P^T, \quad (2)$$

where a projection matrix P has been introduced.

Conveniently, Equation (2) can be rewritten as follows:

$$v_{pos} = \begin{bmatrix} \alpha & \gamma \\ \gamma & \beta \end{bmatrix}^{-1}, \quad (3)$$

where the values of $\alpha$ and $\beta$ are dependent on the assumptions of the problem. The trace of the matrix $v_{pos}$ represents the Cramer-Rao bound on the 2D position and represents the lower bound on the variance obtainable by an optimal position algorithm (not using any other a priori information). The spectral decomposition of $v_{pos}$ is what forms the error ellipse. The eigenvectors and eigenvalues of $v_{pos}$ represent the direction, and size, respectively, of the semi-major axis of the error ellipse in the 2D plane.

A particular form is assumed for the distribution function for the received signal strength S (in dB) received at a position $(x_0, y_0)$ from a signal emanating from a node at position $(x, y)$. The following expression is taken:

$$-\ln f(S) = \frac{\left[S + n\ln\left(\frac{d}{d_0}\right)\frac{10}{\ln 10}\right]^2}{2\sigma_{dB}^2}, \quad (4)$$

where n is the environment dependent path-loss exponent, $\sigma_{dB}$ is the standard deviation of the shadowing in dB, $d_0$ is a receiver reference distance (which in the formalism shown here must be set to one), and the distance between receiver and transmitter is:

$$d = \sqrt{(x-x_0)^2 + (y-y_0)^2 + (z-z_0)^2}. \quad (5)$$

Assuming that the distances from the receiving node to N detectable transmitting nodes ($d_{i=1...N}$) are known, the path loss exponent is known, and the noise term is known. The only unknowns of the system are the two coordinates $x_0$, $y_0$. With these assumptions can show that the terms of Equation (3) are:

$$\alpha = b \sum_{i=1}^{N} \frac{\cos^2 \varphi_i}{d_i^2}, \quad (6)$$

$$\beta = b \sum_{i=1}^{N} \frac{\sin^2 \varphi_i}{d_i^2}, \text{ and} \quad (7)$$

$$\gamma = \frac{b}{2} \sum_{i=1}^{N} \frac{\sin 2\varphi_i}{d_i^2}, \text{ where} \quad (8)$$

$$b = \left[\frac{10n}{\sigma_{db}\ln 10}\right]^2 \quad (9)$$

and the angle $\phi_i$ is defined:

$$\cos\phi_i = \frac{x_i - x_0}{d_i \cos\theta_i}, \quad (10)$$

or alternatively as:

$$\sin\varphi_i = \frac{y_i - y_0}{d_i \cos\theta_i}. \quad (11)$$

Thus, the lower bound on the standard deviation of the $x_0$, $y_0$ position can be rewritten as:

$$\sigma_{xy} \geq \left\{\frac{\sum_{i=1}^{N} \frac{1}{d_i^2}}{\sum_{i=1}^{N-1}\sum_{j=i+1}^{N} \frac{\sin^2(\varphi_i - \varphi_j)}{d_i^2 d_j^2}}\right\}^{1/2} \quad (12)$$

The spectral decomposition of $v_{pos}$, with the matrix parameters set as described by Equations (6), (7) and (8), allows the error ellipse associated with a potentially malicious node entering the system to be determined. This error ellipse forms the basis for the decision as to whether the node is marked as malicious or friendly.

Although parameters of the propagation model can be pre-estimated in some situations (see below), consider the case where the path loss exponent n is unknown. This is not an unlikely situation where the wireless network is mobile and has been positioned in an unknown environment. In this case, n is a nuisance parameter, and determination of the 2D error ellipse for position must involve the full 3×3 FIM with the appropriate projection. In this case, the elements of $v_{pos}$ are:

$$\alpha = b \sum_{i=1}^{N} \left\{\begin{array}{c} \frac{\cos^2\varphi_i}{d_i^2}\left[1 - \frac{1}{S_n}\ln^2\left(\frac{d_i}{d_0}\right)\right] - \\ \frac{1}{S_n}\frac{\cos\varphi_i}{d_i}\ln\left(\frac{d_i}{d_0}\right)\left[\sum_{j=1(j\neq i)}^{N}\frac{\cos\varphi_j}{d_j}\ln\left(\frac{d_j}{d_0}\right)\right] \end{array}\right\}, \quad (13)$$

$$\beta = b \sum_{i=1}^{N} \left\{\begin{array}{c} \frac{\sin^2\varphi_i}{d_i^2}\left[1 - \frac{1}{S_n}\ln^2\left(\frac{d_i}{d_0}\right)\right] - \\ \frac{1}{S_n}\frac{\sin\varphi_i}{d_i}\ln\left(\frac{d_i}{d_0}\right)\left[\sum_{j=1(j\neq i)}^{N}\frac{\sin\varphi_j}{d_j}\ln\left(\frac{d_j}{d_0}\right)\right] \end{array}\right\}, \text{ and} \quad (14)$$

$$\gamma = b \sum_{i=1}^{N} \left\{\begin{array}{c} \frac{\sin 2\varphi_i}{2d_i^2}\left[1 - \frac{1}{S_n}\ln^2\left(\frac{d_i}{d_0}\right)\right] - \\ \frac{1}{S_n}\frac{\cos\varphi_i}{d_i}\ln\left(\frac{d_i}{d_0}\right)\left[\sum_{j=1(j\neq i)}^{N}\frac{\sin\varphi_j}{d_j}\ln\left(\frac{d_j}{d_0}\right)\right] \end{array}\right\}, \text{ where} \quad (15)$$

$$S_n = \sum_{i=1}^{N} \ln^2\left(\frac{d_i}{d_0}\right). \quad (16)$$

Note that the (now larger) lower bound on the standard deviation of the $x_0$, $y_0$ position in this case is now:

$$\sigma_{xy(n)} \geq \left[\frac{(\alpha + \beta)}{(\alpha\beta - \gamma^2)}\right]^{\frac{1}{2}}. \quad (17)$$

The resulting error ellipse associated with this bound is once again determined from the spectral decomposition of $v_{pos}$, but this time with the matrix parameters set as described by Equations (13)-(16). This larger error ellipse can be used to set a second threshold for network security purposes. If the network manager deems it appropriate (e.g., that person has little a priori knowledge of the path loss exponent), the network manager may use this second error ellipse as the basis for determining whether a node is malicious.

Extension of this same argument to other nuisance parameters is straightforward. Another potential example is the height as a nuisance parameter. Although this could be handled by higher dimensional error ellipsoids, its encapsulation in the framework outlined here would be to set the parameters of $v_{pos}$ to:

$$\alpha = b \sum_{i=1}^{N} \left\{\begin{array}{c} \frac{\cos^2\varphi_i \cos^2\theta_i}{d_i^2}\left[1 - \frac{\sin^2\theta_i}{d_i^2 S_z}\right] - \\ \frac{1}{S_z}\frac{\cos\varphi_i \cos\theta_i \sin\theta_i}{d_i^2}\left[\sum_{j=1(j\neq i)}^{N}\frac{\cos\varphi_j \cos\theta_j \sin\theta_j}{d_j^2}\right] \end{array}\right\}, \quad (18)$$

-continued $$\beta = b \sum_{i=1}^{N} \left\{ \begin{array}{c} \frac{\sin^2\varphi_i \cos^2\theta_i}{d_i^2} \left[1 - \frac{\sin^2\theta_i}{d_i^2 S_z}\right] - \\ \frac{1}{S_z} \frac{\sin\varphi_i \cos\theta_i \sin\theta_i}{d_i^2} \left[\sum_{j=1(j\neq i)}^{N} \frac{\sin\varphi_j \cos\theta_j \sin\theta_j}{d_j^2}\right] \end{array} \right\}, \quad (19)$$

and $$\gamma = b \sum_{i=1}^{N} \left\{ \begin{array}{c} \frac{\sin 2\varphi_i \cos^2\theta_i}{2d_i^2} \left[1 - \frac{\sin^2\theta_i}{d_i^2 S_z}\right] - \\ \frac{1}{S_z} \frac{\cos\varphi_i \cos\theta_i \sin\theta_i}{d_i^2} \left[\sum_{j=1(j\neq i)}^{N} \frac{\sin\varphi_j \cos\theta_j \sin\theta_j}{d_j^2}\right] \end{array} \right\}, \quad (20)$$

where $$S_z = \sum_{i=1}^{N} \frac{\sin^2\theta_i}{d_i^2}, \quad \text{and} \quad (21)$$

$$\sin\theta = \frac{z - z_0}{d_i}. \quad (22)$$

Again it the network operator determines the circumstances are appropriate, the network operator can revert to the error ellipse associated with these terms as the most appropriate for his security assessment.

The LESS system takes as an input the value of the threshold parameter T, which is set a priori by the network operator. A friendly node is one whose true position is its claimed GPS coordinates (ignoring the relatively small GPS errors). The requesting node is granted access to (or authorized to access) the network if the LESS system determines that S is greater than or equal to the value of T. Having just described how error ellipses are determined, consideration is given to how the determination of S is made given a determination of the radio position.

The error ellipses are contours of constant probability in the two-dimensional position plane. The probability P of a radio position being inside an error ellipse centred at the true position is given by:

$$P = 1 - e^{\frac{K}{2}} \quad (23)$$

where K is a scaling factor for an ellipse (eigenvalues are scaled by $\sqrt{K}$ to get new axis lengths). If K=1, the probability of a radio position being within the error ellipse is ≈39%. When an actual position is determined, the scaling required in order for the error ellipse to pass through that position can be found. Having determined K, the contour of P that intersects the node position is found using Equation (23). The value of S, given by S=1−P, is the probability that a friendly node may be on or outside the scaled ellipse by chance. If S is determined to be too small (less than the value of T), the node is designated as potentially unfriendly, and access to the network is denied. Given that a malicious node is likely to be well away from the claimed position, a low value of T would be a likely input. If T=0.05, only 5% of the time would a friendly node be designated (falsely) as unfriendly, but a true malicious node (far removed from claimed position and thus outside the scaled error ellipse) would be correctly designated as unfriendly.

Figure 4:
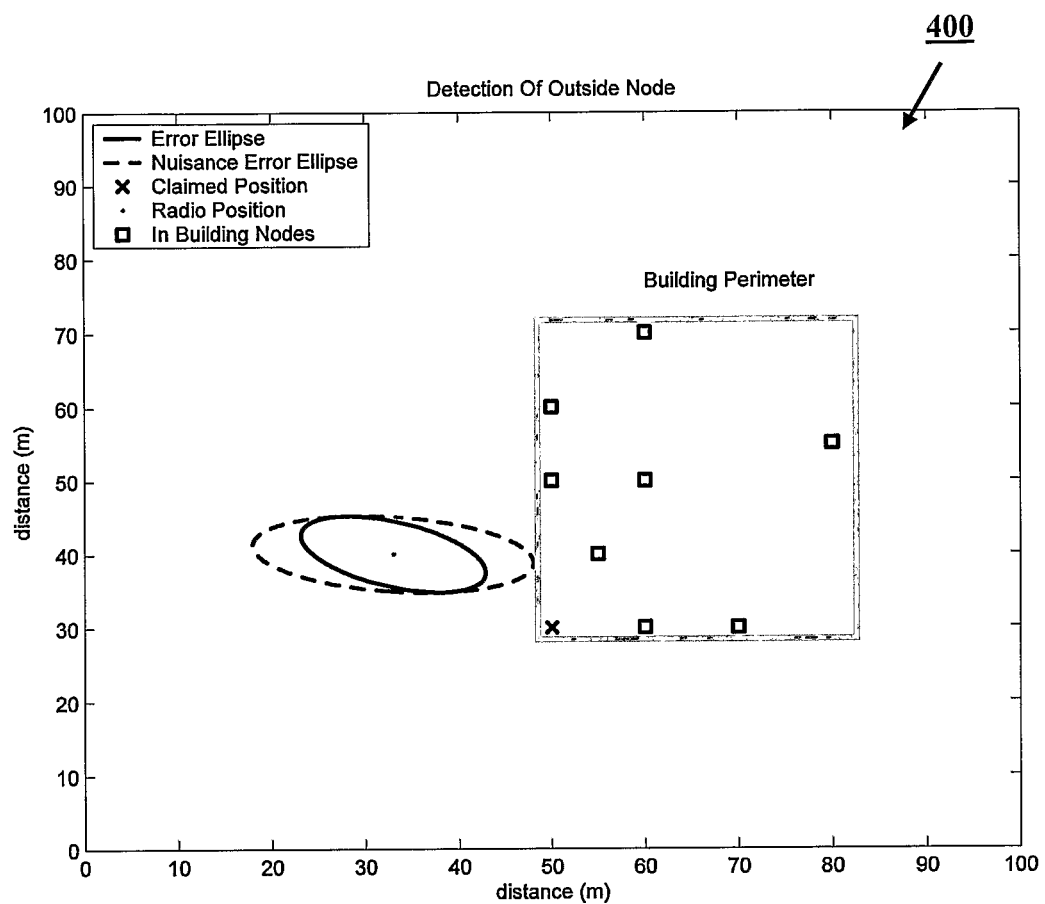
FIG. 4 is a plot showing nodes with predetermined positions within the perimeter of a building and a new node requesting access to the wireless network.

FIG. 4 is a plot 400 of nodes with some predetermined positions depicted within the perimeter of a building. These positions are assumed to be known and made available to the LESS system (e.g., this information could be either through some identity label such as a room number or through indoor GPS capabilities). A new node requests access to the network and claims the node's position to be such that the node is in the building perimeter. This claimed position is made available to the LESS system. However, the radio position (derived from the positioning system of the wireless network) positions the new node to be outside the building and therefore a potential malicious threat to the system. However, for the LESS system to take the next step and mark this node as malicious, the LESS system must obtain a probability level associated with the radio position. Equivalently, the GPS position can be used as the point where ellipses are calculated, and comparison with radio position may be made. Indeed, in most outdoor situations, this would be the case as GPS is generally more reliable. At this point, the LESS the system does not know that the uncertainty in the radio position could be compatible with the new node being within the building. If the parameters underlying the propagation model of the positioning system (n for example) are all known and do not need to be treated as nuisance parameters, the LESS system calculates the appropriate error ellipse for this case. This is the solid ellipse of FIG. 4. The system has the ability to make a strong and quantitative determination that the node is indeed malicious, and access to the network can be denied.

The operator of the LESS system can decide what probability level to assign as the threshold and then compares this with the probability level determined from the ellipse position and the claimed position. This interplay between the error ellipse and the claimed position is significant to the LESS system.

If the LESS system is instructed that some of the parameters of the propagation model are unknown and must be treated as nuisance parameters, the LESS system reverts to a second error ellipse. The error ellipse for the case where the path-loss exponent n is the nuisance parameter is shown as the dashed ellipse of FIG. 4. In this particular calculation, once again the LESS system finds the ellipse to be such that the new user is likely outside the building. Note the calculations shown adopted n=3 and $\sigma_{dB}$=7 dB, which are values typical of an indoor environment.

Figure 5:
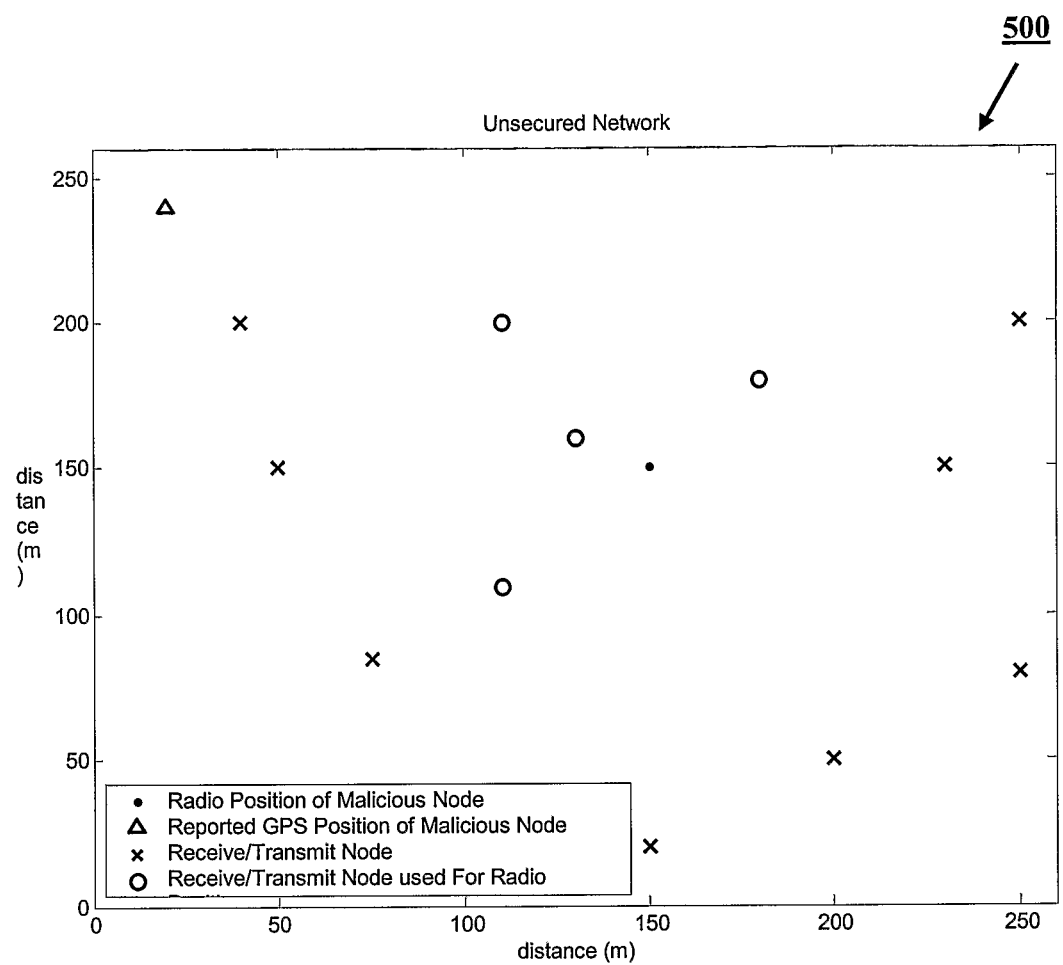
FIG. 5 is a plot showing the use of error ellipses for secure routing through an ad hoc mobile network.

FIG. 5 illustrates another example 500 of the use of error ellipses. In this scenario 500, the error ellipses are used for obtaining secure routing through an ad hoc mobile network. FIG. 5 shows the initial set-up. An existing ad hoc mobile network is in place (indicated by circles and crosses). All of these nodes have intrinsic positioning via GPS, and this position information is known by the LESS system. A new node appears and requests access to the network. The requesting node informs the system of its claimed position (indicated by the triangle). The pre-existing, authorised nodes within range of the new node (marked by circles) measure the new node's signals and form a radio position significantly removed from claimed position. Using the GPS positions of the nearby nodes, the error ellipses for the GPS position of the requesting node are calculated by the LESS system. After determining the security value (the probability S), the requesting node is deemed malicious. Error ellipses are then re-calculated for the radio position (as the claimed GPS position is suspect).

Figure 6:
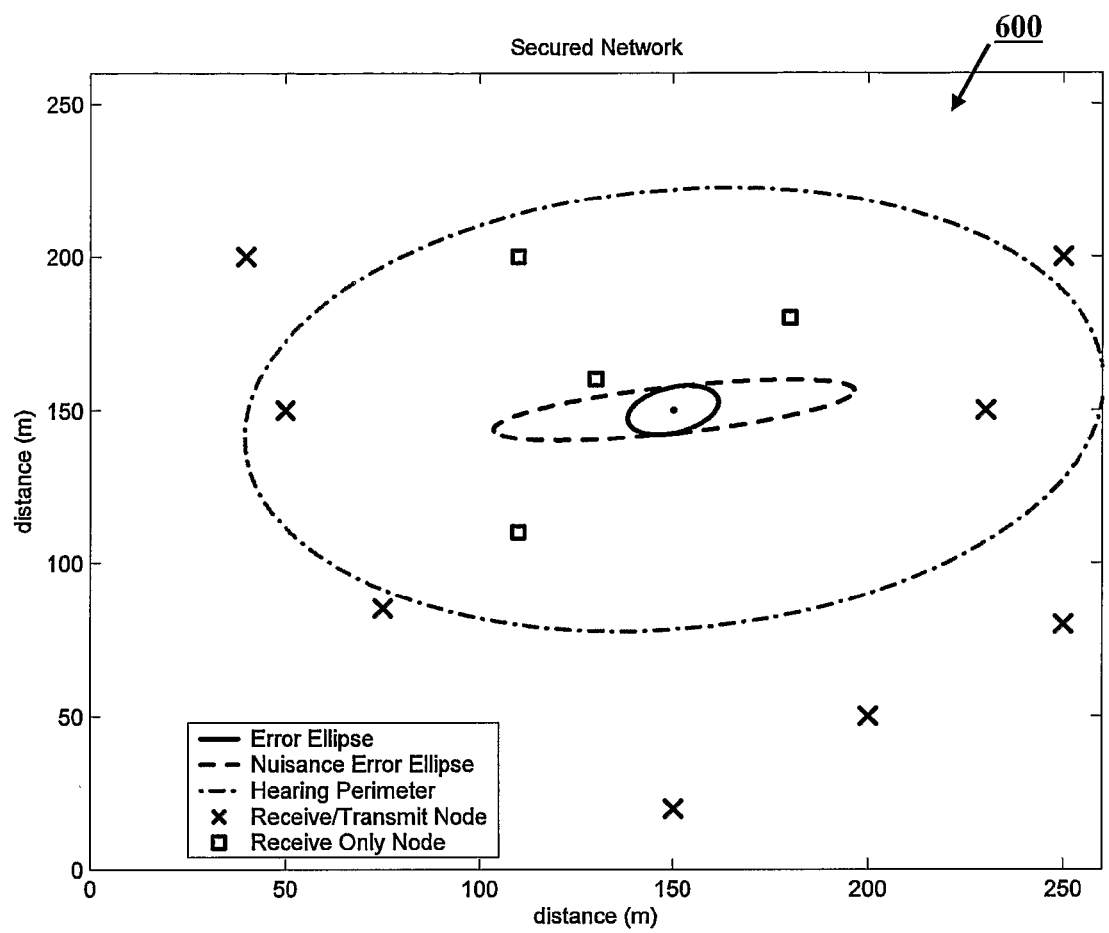
FIG. 6 is a plot showing the interplay between a claimed position and an error ellipse edge.

The two error ellipses 600 shown in FIG. 6 are for the same circumstances discussed hereinbefore (solid line for no nuisance parameter case; dashed line for n as nuisance parameter case). Once again using the interplay between the claimed position and the error ellipse edge, the operator of the LESS system can check a security threshold and determine (in a quantitative manner) that this node is indeed malicious. Note the calculations of FIGS. 5 and 6 adopted n=2 and $\sigma_{dB}$=3 dB, which are values typical of an outdoor environment.

Having identified the node as malicious, a perimeter around the error ellipse can be defined beyond which the node cannot hear any other node. This perimeter is loosely referred to as a "hearing ellipse" (dashed-dot curve of FIG. 6). The hearing ellipse is constructed by adding a constant distance, $r_f$, to the perimeter of a base ellipse. In the calculation shown in FIG. 6, the base ellipse chosen is the nuisance ellipse, and $r_f$ is set equal to the distance between the malicious node's radio position and the node closest from that position, but out of range of the malicious node's radio signals (farthest circle from the radio position). However, in general, this distance could be set differently. The operator's estimate of the range over which malicious node could detect a secure node could be larger than that adopted here (e.g., due to perceived enhanced capability on malicious node's receiver).

For routing purposes, any node within the hearing ellipse or any node about to enter the hearing ellipse has its broadcast privileges revoked. Only those existing, authorized nodes outside the ellipse (or a certain distance outside or inside the ellipse edge—depending on required probability level) have broadcast privileges. This ensures that (with a predetermined level of probability) a malicious node would not receive any network traffic. Although there remains the possibility that some friendly nodes within the ellipse would also not receive such traffic, the network operator can determine whether that cost is worth the confidence of a malicious node not being able to intercept traffic. The probability levels ascribed to the process are completely within the operator's control.

V. Summary and Extension to Include Variants on the Above Process

The following is a summary of the above process and includes variations to the same:
1) Use pre-existing friendly nodes to determine parameters of propagation models, such as noise and path exponent loss. Note that the estimates may themselves be position dependent. For example, the propagation constant (path loss exponent) may be a function of position or direction.
2) Make a decision whether to adopt the estimated propagation parameters or whether to treat the parameters as nuisance parameters. This decision may be based on the number and quality of measurements.
3) Determine the error ellipses associated with the radio position of a potential malicious node. Which ellipse to use in determining probability bounds is determined by the decision in step 2).
4) Set the probability level associated with the decision making process.
5) Using the above steps 1)-4), decide whether the requesting node is to be marked as malicious.
6) Determine a base ellipse and a distance $r_f$ to be added to base ellipse. The value of $r_f$ could be determined by various criteria, such as a radius deemed by operator to be beyond the receiving capability of malicious node, or from actual in field measurements of receive ranges.
7) Set up routing protocol so that any node having GPS coordinates (or other intrinsic position information) that place the node within the hearing ellipse, is not allowed to broadcast.
8) In cases of an undetermined radio position (due to only one or two friendly nodes in receiving range of malicious nodes), the above procedure may still be deployed in another—albeit and less accurate—way. Cramer-Rao bounds on range estimates could be used to set "hearing circles", and similar decisions as outlined hereinbefore may be made. An identification of malicious nodes may still occur if claimed position is outside the range of radio position estimates. A security routing system may still be deployed at the cost of marking friendly nodes as non-broadcast nodes.
9) Other formal methods of developing error ellipses and bounds may be used within the system in an obvious extension of the LESS system. These other bounds include those that involve prior information within the error estimates. Examples of such Bayesian bounds are the Ziv-Zakai: see J. Ziv and M. Zakai, "Some lower bounds on signal parameter estimation," *IEEE Trans. Inform. Theory*, Vol. IT-15, No. 3, pp. 386-391, May 1969. Such prior information may be in the form of probability distributions regarding noise levels and path loss exponents along different directions. Indeed some of these other bounds such as and the family of Weiss-Weinstein bounds, can be described as Bayesian extensions to the Cramer-Rao bounds outlined here: see H. L. Van Trees, *Detection, Estimation, and Modulation Theory, Part I*. New York: Wiley, 1968. Regardless of the bounds used, an important point remains the development of formal error bounds in physical space coupled to claimed position information. This interplay between these two pieces of information allows quantitative security levels to be set within the LESS system in a formal and systematic way.
10) The same principles apply to any wireless position technology, such as those that use timing measurements and/or angle of arrival measurements. Error ellipses for such cases may be determined using the same principles outlined hereinbefore.

VI. Routing Engine Module

With reference to FIG. 1, the routing engine module 120 aims to determine a secure routing path through the wireless network. Security is at least one optimisation criteria. The routing engine module 120 uses known statistics 122 of all verified nodes (i.e. at least one existing, authorized node) to ensure data is not routed through a node of malicious user, or a verified node within hearing distance of a node identified as a malicious user. The known statistics 122 may be the error ellipses, for example.

The routing engine module 120 minimises the chance of a malicious user, who managed to gain access to the wireless network, being designated as a main throughway for the data traffic in the large network, or for routing traffic through nodes that are not within the 'listening' range of a malicious node. From a security standpoint, routing architectures based on hierarchical clustering are an efficient design. See Royer, E., and Toh, C., mentioned above. In this scheme, not all nodes are designated as routers. Key nodes are identified as the main routing path, feeding only those nodes in their own vicinity. With optimal route selection based on security, the hierarchical clustering algorithm may be merged with calculated probability levels on position. The problem then is to minimize the probability of a malicious user being designated as a key node in the hierarchical design. Even if the malicious user is inadvertently allowed into the system, a malicious node would only have access to traffic designated specifically to that node, or from other nodes within its single hop radius.

As noted above, the routing engine module 120 determines the optimal security path through the wireless network depending on several factors, namely the known statistics 122. In this regard, the type of environment the network is in is important (e.g., Gaussian versus non-Gaussian errors), as is the weighting factors given to the different optimisation criteria. A simple example involves Gaussian errors, with a weighting factor of one given to security. In this case, the path is selected where some functional form of the Cramer-Rao bounds at each node along the path is minimised (e.g. the sum). Likewise, the known statistical information 122 may be used to ensure that routing of data does not pass through a verified node that is within hearing distance of a node identified as a malicious user. Avoiding areas within the hearing distance is now described in detail.

Figure 8:
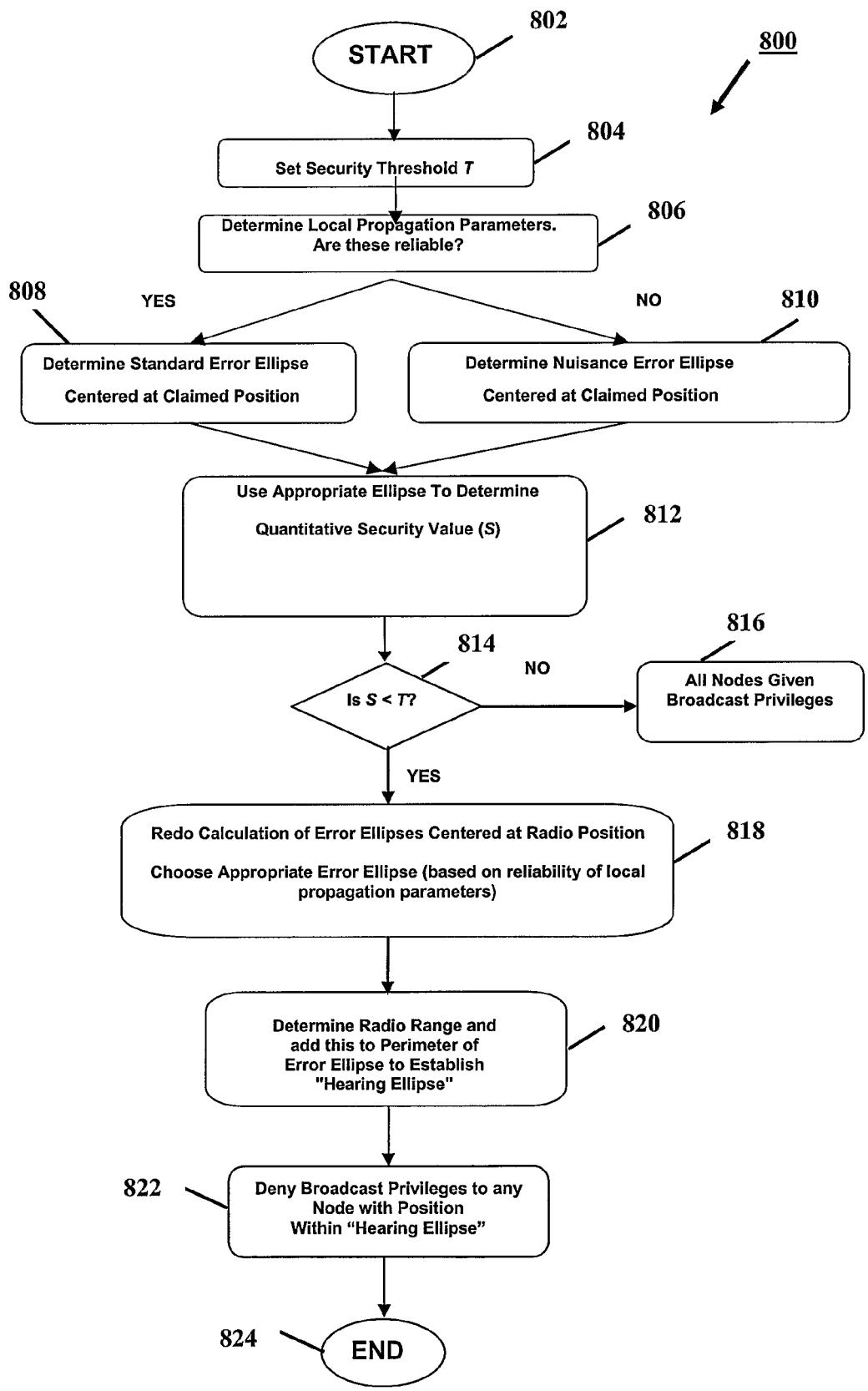
FIG. 8 is a flow diagram illustrating a process of determining a secure routing path through the wireless network.

FIG. 8 is a flow diagram illustrating a process 800 of routing data using a routing engine module. Processing commences in step 802. In step 804, the security threshold T is set a priori. In step 806, the local propagation parameters (e.g., the path loss exponent and noise parameter of the propagation model) are determined. These may be the parameters in the vicinity of the requesting node. A determination may be made as to whether this determination is reliable. This may be done by looking at signal to noise in system and residuals, for example. Steps 808 and 810 may be performed in parallel, as depicted in FIG. 8, or sequentially.

If the propagation parameters of step 806 are reliable, the standard error ellipse centered at the claimed position of the requesting node is determined in step 808. If the propagation parameters are deemed unreliable in step 806, this is the "nuisance" error ellipse as defined earlier and the nuisance error ellipse centered at the claimed position is determined. From step 808 or 810, processing continues at step 812.

In step 812, using the appropriate error ellipse, the quantitative security value S associated with the node is determined. This can be done by determining S=1-P, where P is given by Equation 23.

In step 814, a check is made to determine if S<T. If step 814 returns false (NO), processing continues at step 816. In step 816, all nodes (including the requesting node) are given broadcast privileges. Processing then terminates. Otherwise, if step 814 returns true (YES), processing continues at step 818.

Since the requesting node is now considered potentially malicious, a security routing must be enabled, which is now described. Since the claimed position is no longer of value (i.e., the position is suspect), in step 818, the error ellipses centered at the radio position of the requesting node are re-calculated. Further, an appropriate error ellipse is chosen based on the reliability of the local propagation parameters (see step 806).

In step 820, the radio range is determined and added to the perimeter of the error ellipse adopted to establish a hearing ellipse. This is the range over which the suspected node can detect signals. In step 822, any nodes having a position within the hearing ellipse are denied broadcast privileges. Because of this, the suspect node is unlikely to receive any network traffic (at a probability level set by the threshold value T). Processing terminates in step 824.

Many routing protocols for wireless networks have been proposed (for a review of routing over ad hoc wireless networks, see E. M. Royer and C.-K. Toh, "*A review of current routing protocols for ad-hoc mobile wireless networks*," IEEE Personal Communications Magazine, April 1999, pp. 46-55). Any of these routing protocols may be readily adapted for the LESS system. The key modification of existing routing protocols for a LESS system is that no node within the hearing ellipse is allowed to re-transmit any packets that node receives. This concept may further be extended to force the route from one friendly node to the end destination node to take an optimal security path. This means the route is selected that maximizes the distance from the hearing ellipse while still retaining path connectivity path through the network from sending node to received node. This path represents the optimal security route. The routing tables at each friendly node may be updated to reflect such optimal security routes.

VII. Mobility Engine Module

The mobility engine module 124 is another addition to the LESS system 100 that may be practiced. This module 124 uses received signals 126 and filtering techniques 128, such as a particle filter, to enhance the LESS system 100 further by attempting to track existing authorized nodes to update the radio position of a node requesting access to the wireless network.

Mobility of nodes provides further challenges to the LESS system 100. In many circumstances, it is unrealistic to expect all nodes within the network to remain stationary for a significant length of time. Indeed, mobility presents many serious challenges to traditional wireless networks (breakdown of routing routes, variable communication quality, etc.). A security system based on location must be able to seamlessly embed mobility within its decision-making criteria.

One way to accommodate mobility within is the use of instantaneous GPS position information. At the time of accessing a wireless network, nodes are requested to update their positions, and the security procedures outlined previously are then adopted. However, in a rapidly evolving network, this may be cumbersome as well as shortening the lifespan of the network due to GPS power consumption.

In normal wireless position systems tracking of mobile users is normally attempted by the use of recursive filter techniques. Given some dynamical model of the node's movement and some model of the noise in the system, filter techniques have been shown to provide significant improvement in the position capability of an algorithm. If the changing positions of the existing authorized nodes can be modelled to reasonable accuracy, the number of requests for the entire system to update its GPS database is reduced.

Figure 9:
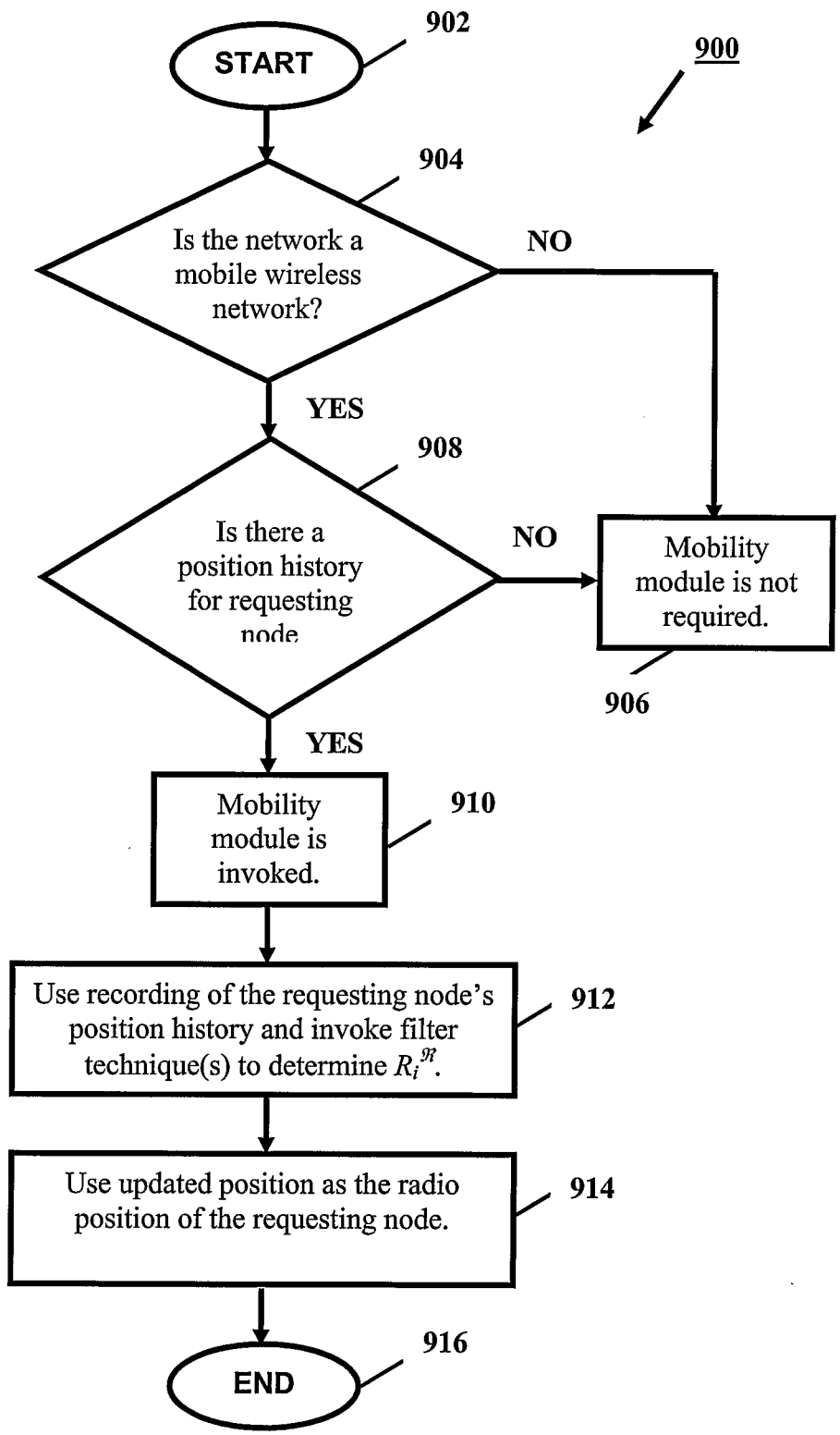
FIG. 9 is a flow diagram illustrating a process of updating the position of a node requesting access to the wireless network by tracking existing authorized nodes in the wireless network.

FIG. 9 is a flowchart of a process 900 of tracking nodes. Processing commences in step 902. In decision step 904, a check is made to determine if the network is a mobile wireless network. The network operator may determine this a priori. For example, in an office environment, the network operator would likely deem the network to be a static one. In an environment where on-board vehicular nodes are present, the network operator would likely consider the network to be a mobile network. If step 904 returns false (NO), processing continues at step 906, in which the mobility module is not required. Otherwise, if step 904 returns true (YES), processing continues at step 908.

In decision step 908, a check is made to determine whether the requesting node has a position history (i.e., a past history of radio positions logged in the LESS system). If for example this is first time the wireless network has received signals from the requesting node, no prior record of its radio positions is available. Thus, if step 908 returns false (NO), processing continues at step 906. Otherwise, if step 908 returns true (YES), processing continues at step 910. In step 910, the mobility module is invoked In step 912, a recording of the past history of the requesting node's positions is used and filter techniques are invoked to determine an updated radio position, $R_t^{\Re}$, for the requesting node. The filter technique may be the Particle Filter. This is a well known filter technique considered to be applicable to mobile tracking: see Krumm, J., "Probabilistic Inferencing for Location," 2003 Workshop on Location-Aware Computing (Part of UbiComp 2003), Oct. 12, 2003, Seattle, Wash., USA. In step 914, the updated position $R_i^{\Re}$ is used as the radio position of the requesting node in the analysis done in block 310 FIG. 3 instead of $R_j$, where $R_j$ is the radio position attained without recourse to the mobility module. Processing terminates in step 916.

The position history of the existing authorized nodes may also be used to improve the accuracy of the updated position $R_i^{\Re}$ using same filter based techniques. That is, the updated position can be determined using the position history (-ies) of the requesting node, at least one of the existing authorized nodes, or both.

VIII. Other Wireless Networks

While the above embodiments of the invention have been described with reference to IEEE 802.11 architectures, the LESS system may be applied to 3G networks. Next generation 3G mobile phone networks are slowly commencing their deployment phase. These networks promise a range of enhanced functionality relative to 2G networks, such as GSM. It is believed that in 3G networks, Location Based Services based on embedded positioning algorithms will be a major new revenue source for the network operators.

While the underlying technology that delivers the actual position location is still being contested, one possibility is Qualcomm's Assisted-GPS (A-GPS) technology. See Qualcomm/Snaptrack White Paper, *How A-GPS Works*, 2001, (http://www.snaptrack.com/pdf/How_aGPS_works.pdf). This technology uses assistance data from GPS receivers attached elsewhere in the network to assist a GPS system embedded on the mobile phone chipset. This assistance data contains information that the phone's system normally has to demodulate, as well as other information that increases start-up sensitivity by as much as 25 dB. A-GPS is said to overcome traditional GPS limitations, receive weak attenuated GPS signals indoors, and perform adequately in a wide range of challenging call environments where conventional GPS solutions fail to deliver.

A-GPS fits well in the LESS system 100 of FIG. 1 as A-GPS provides the claimed position 116 (derived independent of the wireless network) required by the system 100. The 3G network's intrinsic signals may be used to confirm that the A-GPS solution had not been tampered with by an unauthorized user seeking access to the network. In 3G, the medium access is one of Code Division Multiple Access (CDMA). Much effort has been spent on delivering a positioning system within CDMA technology without the use of GPS. The basic technique is to use time-of-arrival (TOA) information from receiver to base station (or vice versa). This timing information is derived from code acquisition at the spread spectrum receivers, and the use of sliding correlators (or matched filters) based on the received and sent signals. Although suffering somewhat from the near-far problem, such techniques can provide independent verification of a node's position within the network. See Caffery, J., *Wireless Location in CDMA Cellular Radio Systems*, Kluwer Academic Publishers; Oct. 1, 1999, ISBN: 0792377036, (shortened version at http://citeseer.nj.nec.com/caffery98overview.html).

In the context of 3G networks, one feature of the LESS security system can be highlighted. The relevant feature is the ability of the system to function even if a formal position location for a new (potentially malicious) node is not returned by the wireless network. In a 3G network, this would occur if only one base station is within range of the new node. 3G networks are designed with a view to optimizing communication connectivity—not position location. Thus, the chances of a mobile node being within range of only one base station is not unlikely. Also, even if farther afield base stations are in range, those base stations have a stronger possibility of possessing strong bias in their timing measurement due to a likelihood of increased multipath. In this case, one may wish to discard the additional stations.

Figure 10:
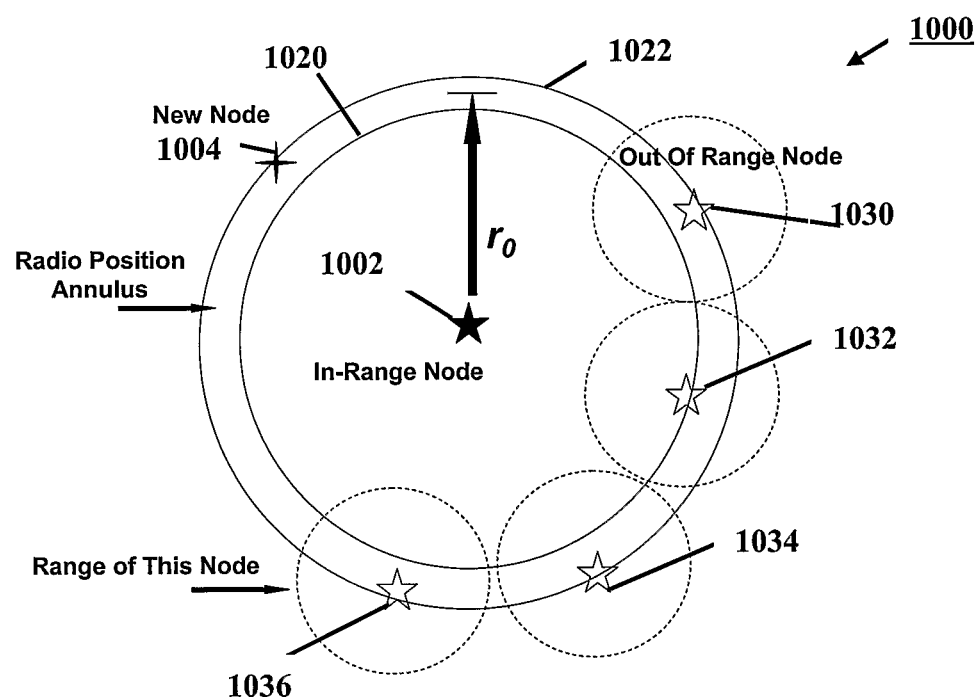
FIG. 10 is a block diagram illustrating a 3G wireless network where only one pre-existing, authorized node is within the range of a new node requesting access to the network.

FIG. 10 illustrates a typical set-up 1000 where only one pre-existing, authorized node 1002 (indicated by a solid star) is within the range of the new node 1004 (indicated by a cross) requesting access to the network. In the absence of any bias, the in-range node 1002 uses the time-of-arrival (TOA) information to construct an optimal estimate of the radio range $r_0$ (distance to base station), from which a circle C of radius $r_0$, centered on the in-range node 1002 can be constructed. An annulus can be constructed from circle C by enlarging (by equal amounts) an outer circle 1022 and reducing an inner circle 1020 until one of the annulus edges passes through the claimed GPS position of the new node 1004 (circle C would be in center of annulus).

In FIG. 10, the outer edge 1022 of the annulus passes through the requesting node 1004. Consider the distance $r_E-r_0$, where $r_E$ is the radius of the annulus edge 1022, which passes through the new node 1004. As in descriptions hereinbefore, the edge of the annulus can be taken to represent contours of constant probability. The probability P in this case is determined using straightforward statistics from the distance $r_E-r_0$, and the estimated standard deviation of the timing noise $\sigma_T$. For example, if $r_E-r_0=2\ \sigma_T$, P=0.95. The security value can be determined from S=1−P, where S is the probability that a friendly node could be on or outside of the radio annulus by chance.

If any bias is detected by the system 1000 (from the intra-signal measurements of the authorized nodes), some functional form of this measured bias (e.g. the average) may be used to improve the accuracy of the timing information.

Since only the range is being probed, an astute malicious node could fool the security system by providing a claimed GPS position at one location on an annulus edge, but actually be at some other position of the annulus edge (e.g. diametrically opposite). The network operator must take this into consideration in deciding whether to allow the user into the network. However, additional help may come from considerations of the positions of other existing authorized nodes 1030, 1032, 1034, 1036 in the network that cannot hear the new node (indicated by white stars in FIG. 10). By using the fact that the authorized nodes 1030, 1032, 1034, 1036 rule out the new node 1004 being in certain areas of the annulus, additional confidence can be attained. In FIG. 10, the range of the authorized nodes 1030, 1032, 1034, 1036, which are not in range of the new node 1004, are indicated by dashed circles. This range is set by the anticipated range of the nodes added to the small GPS position error.

A new security threshold can be set that uses this information. For example, a weight w can be used which is equal to the fraction of the annulus ruled out by the fact that the new node 1004 cannot be located there. In FIG. 10, w=0.5. A new security threshold can be set as $S_w=S \cdot f(w)$, where f(w) is a functional form of w giving a value of f(w) in the range 0-1. Three examples of this functional form are f(w)=0, f(w)=w, or f(w)=1. The first of these cases corresponds to the network operator assigning no confidence in a range estimator, and the last case corresponds to full confidence in a range estimator.

Figure 11:
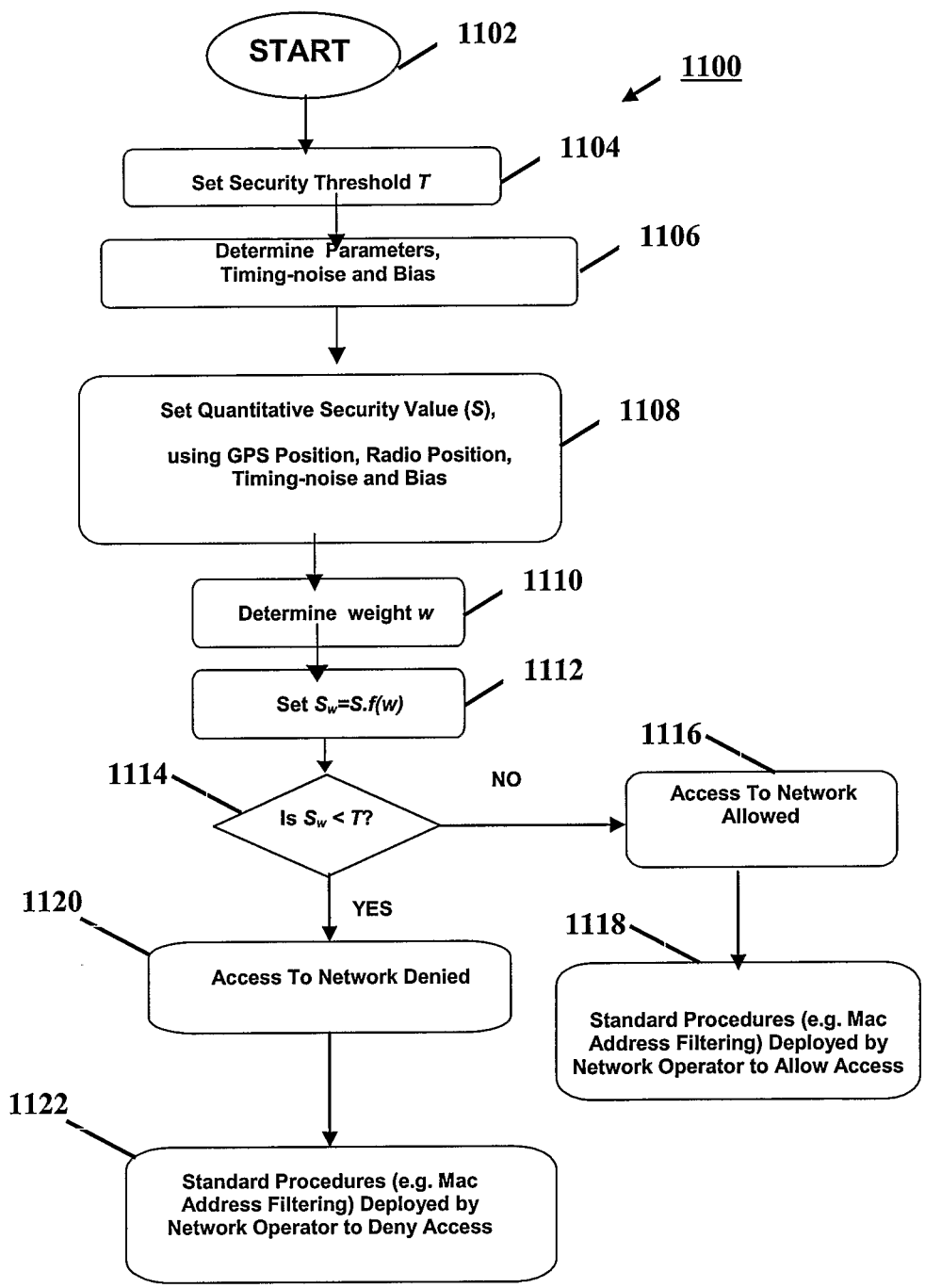
FIG. 11 is a flow diagram illustrating a process of providing location-enabled security services in a 3G network.

FIG. 11 is a flow diagram illustrating a process 1100 of providing location-enable security services in the 3G network of FIG. 10. Processing commences in step 1102. In step 1104, the security threshold T is set a priori. In step 1106, the timing-noise and any bias are determined (in the manner described hereinbefore). Alternatively, these parameters may be simply estimated a priori by the operator. In step 1108, a quantitative security value S is set (in the manner described hereinbefore—a probability level). This may be done using GPS position, radio position, timing noise and bias. In step 1110, a value of the weight w is determined. This can be set by the operator a priori (e.g. 0 or 1), or the weight w can be determined by calculating the fraction of annulus where the new node cannot be allowed (in the manner described hereinbefore). In step 1112, a new security value $S_w$ is determined (in the manner described hereinbefore), where $S_w = S \cdot f(w)$.

In decision step 1114, a check is made to determine if $S_w < T$. If step 1114 returns true (YES), processing continues at step 1120. In step 1120, access to the network is denied. In step 1122, standard procedures (e.g. MAC address filtering) are deployed by the network operator to deny access to the requesting node. Processing then terminates. If decision step 1116 returns false (NO), processing continues at step 1116. In step 1116, access for the requesting node to the network is allowed. In step 1118, standard procedures (e.g. MAC address filtering) are deployed by the network operator to allow access. Processing then terminates.

The angle of arrival (AOA) information could be used to enhance the determination of w in a number of ways—such as determining the angular range inconsistent with the received signals. Such information could be determined, for example, from multiple antenna receivers co-located with (or built into) the base stations or the mobile nodes. The description hereinbefore equally applies to other position location techniques, such as time difference of arrival, RSS techniques and to wireless networks other than 3G. The underlying principles remain the same.

IX. Further Embodiment

Another embodiment of the invention involves a fingerprint of a physical space that has been measured. See P. Bahl and V. N. Padmanabhan, *RADAR: An In-Building RF-based User Location and Tracking System*, in proceeding of INFOCOM, 2000. Here, a fingerprint means the RSS values expected from each authorized node (in most cases an actual WLAN access point) at each point in the physical space is a priori measured. In most fingerprinted positioning systems, the new node (the requesting node) passes its received RSS values to a server, which in turn passes this information to its stored fingerprint to match the RSS values—as best as the server can—to a physical location in its fingerprint. The LESS system in this case operates as described hereinbefore, except that—as previously discussed in the Introduction—the security value S is derived differently.

Instead of having the requesting node simply inform the server of its received RSS values (as is done in normal fingerprint positioning systems), two or more or perhaps all of the access points measure the RSS values received from the requesting node directly, and compare these values with those in the database. This is useful in the case that the fingerprint database is suspected to be known to outside users. In this case, the fingerprint is the RSS values measured by the access points from a standard wireless device (of known output power). However, since a malicious user may use a non-standard device (of unknown power), reconstructing the fingerprint database as a difference of RSS values is useful, rather than as an absolute value. That is, if each access point is labeled i, and the reference device labeled 0, the fingerprint contains the value $RSS_i - RSS_0$ for each access point i at each point in space. A diagram for the LESS system in this case would be the same as that shown in FIG. 3. The difference in implementation is through the determination of the value of S (step 310). Instead of using formal error ellipses based on propagation models, the $RSS_i - RSS_0$ fingerprint is used. The actual probability distribution of a point being a certain distance from the claimed position may be pre-measured, or based on residual analysis of the measured and fingerprint $RSS_i - RSS_0$ values. The simplest of these approaches is use of a pre-measured probability distribution. A pre-measured probability distribution may be constructed by placing a test node at each position in space and measuring the probability that the result reported by the positioning system is a certain distance from the true position.

X. Computer Implementation

Figure 7:
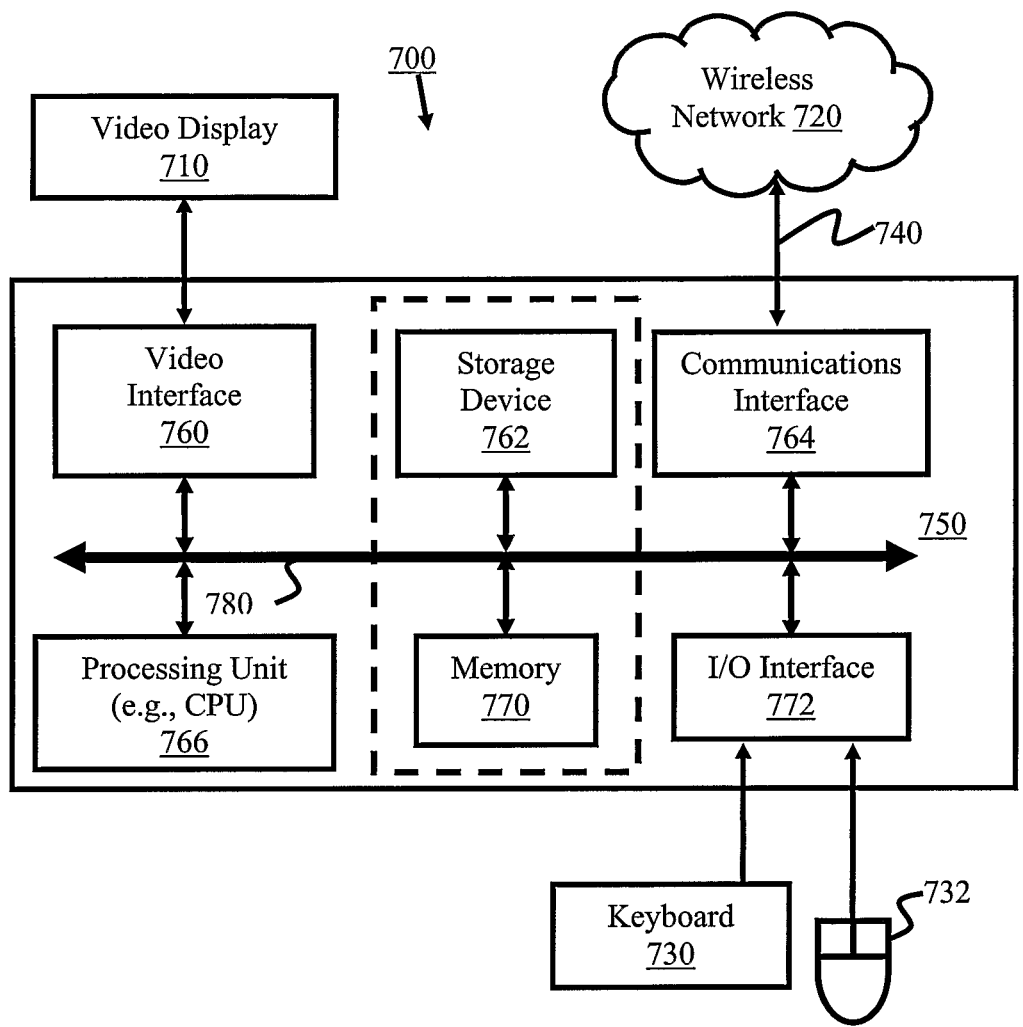
FIG. 7 is a block diagram of a computer system with which embodiments of the invention may be practiced.

The methods according to the embodiments of the invention may be practiced using one or more general-purpose computer systems, handheld devices, cellular phone, and other suitable computing devices, in which the processes described with reference to FIGS. 1-6, and 8-11 may be implemented as software, such as an application program executing within the computer system or a handheld device. In particular, instructions in the software that are carried out by the computer effect the steps in the method, at least in part. Software may include one or more computer programs, including application programs, an operating system, procedures, rules, data structures, and data. The instructions may be formed as one or more code modules, each for performing one or more particular tasks. The software may be stored in a computer readable medium, comprising one or more of the storage devices described below, for example. The computer system loads the software from the computer readable medium and then executes the software. FIG. 7 depicts an example of a computer system 700 with which the embodiments of the invention may be practiced. A computer readable medium having such software recorded on the medium is a computer program product. The use of the computer program product in the computer system may effect an advantageous apparatus in accordance with the embodiments of the invention.

FIG. 7 illustrates the computer system 700 in block diagram form, coupled to a wireless network 720. An operator may use the keyboard 730 and/or a pointing device such as the mouse 732 (or touchpad, for example) to provide input to the computer 750. The computer system 700 may have any of a number of output devices, including line printers, laser printers, plotters, and other reproduction devices connected to the computer. The computer system 700 can be connected to one or more other computers via a communication interface 764 using an appropriate communication channel 740. The computer network 720 may comprise a wireless local area network (WLAN), or a 3G network, for example.

The computer 750 may comprise a processing unit 766 (e.g., one or more central processing units) 766, memory 770 which may comprise random access memory (RAM), read-only memory (ROM), or a combination of the two, input/output (IO) interfaces 772, a graphics interface 760, and one or more storage devices 762. The storage device(s) 762 may comprise one or more of the following: a floppy disc, a hard disc drive, a magneto-optical disc drive, CD-ROM, DVD, a data card or memory stick, flash RAM device, magnetic tape or any other of a number of non-volatile storage devices well known to those skilled in the art. While the storage device is shown directly connected to the bus in FIG. 7, such a storage device may be connected through any suitable interface, such as a parallel port, serial port, USB interface, a Firewire interface, a wireless interface, a PCMCIA slot, or the like. For the purposes of this description, a storage unit may comprise one or more of the memory 770 and the storage devices 762 (as indicated by a dashed box surrounding these elements in FIG. 7).

Each of the components of the computer 750 is typically connected to one or more of the other devices via one or more buses 780, depicted generally in FIG. 7, that in turn comprise data, address, and control buses. While a single bus 780 is depicted in FIG. 7, it will be well understood by those skilled in the art that a computer or other electronic computing device, such as a PDA, may have several buses including one or more of a processor bus, a memory bus, a graphics card bus, and a peripheral bus. Suitable bridges may be utilized to interface communications between such buses. While a system using a CPU has been described, it will be appreciated by those skilled in the art that other processing units capable of processing data and carrying out operations may be used instead without departing from the scope and spirit of the invention.

The computer system 700 is simply provided for illustrative purposes, and other configurations can be employed without departing from the scope and spirit of the invention. Computers with which the embodiment can be practiced comprise IBM-PC/ATs or compatibles, laptop/notebook computers, one of the Macintosh™ family of PCs, Sun Sparcstation™, a PDA, a workstation or the like. The foregoing are merely examples of the types of devices with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory.

In some instances, the program may be supplied encoded on a CD-ROM or a floppy disk, or alternatively could be read from a network via a modem device connected to the computer, for example. Still further, the software can also be loaded into the computer system from other computer readable medium comprising magnetic tape, a ROM or integrated circuit, a magneto-optical disk, a radio or infra-red transmission channel between the computer and another device, a computer readable card such as a PCMCIA card, and the Internet and Intranets comprising email transmissions and information recorded on websites and the like. The foregoing is merely an example of relevant computer readable mediums. Other computer readable mediums may be practiced without departing from the scope and spirit of the invention.

A small number of embodiments of the invention regarding methods, systems, and computer program products for providing location enabled security services in a wireless network have been described. Further, methods, apparatuses, and computer program products for routing data traffic in a wireless network have been described. Still further, methods, apparatuses, and computer program products for updating the position of a requesting node by tracking the positions of existing authorized nodes in a wireless network have been described. In the light of the foregoing, it will be apparent to those skilled in the art in the light of this disclosure that various modifications and/or substitutions may be made without departing from the scope and spirit of the invention.

I claim:

1. A method of providing location enabled security services in a wireless communications network, said method comprising the steps of:

receiving by said wireless communications network a network access request from a mobile network node requesting access to said wireless communications network, said wireless communications network having location-positioning capabilities, said requesting node comprising an electronic device capable of wireless communications in the wireless communications network providing to said wireless communications network information for determining the location of said requesting node;

calculating by said wireless communications network a quantitative security value for said requesting, said quantitative security value calculating step comprising:

using position information about said requesting node derived from signal measurements for said requesting node received by at least one existing authorised node in said wireless communications network, using a different form of position information for claimed position information of said requesting node received by said wireless communications network from said requesting node; and comparing said claimed position information of said requesting node with an error ellipse on the position of the requesting node; and denying by said wireless communications network access to said requesting node to said wireless communications network if said quantitative security value does not satisfy a specified threshold value for network security.

2. The method according to claim 1, further comprising the step of granting by said wireless communications network access for said requesting node to said wireless communications network if said quantitative security value does satisfy said specified threshold value.

3. The method according to claim 1, wherein said position information claimed by said requesting node comprises Global Positioning System (GPS) information about said requesting node.

4. The method according to claim 1, wherein said position information claimed by said requesting node comprises manually specified data for the node.

5. The method according to claim 1, wherein said signal measurements comprise received signal strength (RSS) measurements, time of arrival (TOA) measurements, time-difference of arrival measurements (TDOA), or angle of arrival (AOA) measurements.

6. The method according to claim 1, wherein said wireless communications network is an IEEE 802.11 wireless network, a local area network (LAN), the Internet, a mobile telephone system, a GSM mobile telephone system, PCS, a mesh network, an ad hoc network, a 3G mobile phone network, and a 2G mobile phone network.

7. The method according to claim 1, wherein said specified threshold value for network security is a weighted value, where the weight w applied is dependent upon a location-based parameter where the requesting node is unable to be located.

8. The method according to claim 1, wherein a node comprises an electronic device capable of wireless communications in the wireless communications network.

9. The method according to claim 1, wherein said calculating step comprises sub-steps of:

maintaining a position history for said requesting node and each of one or more existing authorized nodes accessing said wireless communications network; and determining an updated position of said requesting node as the position information about said requesting node using said position information about said requesting node derived from said signal measurements for said requesting node received by said at least one existing authorised node in said wireless communications network and the position history for at least one of said requesting node and each such existing authorised node.

10. The method according to claim 9, further comprising the step of using the updated position of said requesting node as the actual position of said requesting node.

11. The method according to claim 9, wherein said determining step is carried out using a filter technique.

12. The method according to claim 11, wherein said filter technique is a particle filter.

13. The method according to claim 1, further comprising the step of measuring signals from said requesting node by said wireless communications network to provide said signal measurements about said requesting node, wherein the fingerprint means RSS values expected from each authorized node at each point in a physical space is a priori measured.

14. The method according to claim 13, further comprising the step of comparing by said wireless communications network said signal measurements against a database of signal measurements based on a wireless device.

15. The method according to claim 13, wherein position information about said requesting node is determined based on a difference of signal measurements for said requesting node.

16. The method according to claim 13, wherein said measuring step is performed by at least two access points or authorised nodes.

17. A computer program product comprising a computer readable medium having recorded therein a computer program for providing location enabled security services in a wireless communications network, said computer program product comprising:
  computer program code means for receiving by said wireless communications network a network access request from a mobile network node requesting access to said wireless communications network, said wireless communications network having location-positioning capabilities, said requesting node comprising an electronic device capable of wireless communications in the wireless communications network and providing to said wireless communications network information for determining the location of said requesting node;
  computer program code means for calculating by said wireless communications network a quantitative security value for said requesting node, calculating said quantitative security value comprising:
  using position information about said requesting node derived from signal measurements for said requesting node received by at least one existing authorised node in said wireless communications network,
  using a different form of position information for claimed position information by said requesting node received by said wireless communications network from said requesting node; and
  comparing said claimed position information of said requesting node with an error ellipse on the position of the requesting node; and
  computer program code means for denying by said wireless communications network access to said wireless communications network if said quantitative security value does not satisfy a specified threshold value for network.

18. The computer program product according to claim 17, further comprising computer program code means for granting access for said requesting node to said wireless communications network if said quantitative security value does satisfy said specified threshold value.

19. The computer program product according to claim 17, wherein said position information claimed by said requesting node comprises Global Positioning System (GPS) information about said requesting node.

20. The computer program product according to claim 17, wherein said position information claimed by said requesting node comprises manually specified data for the node.

21. The computer program product according to claim 17, wherein said signal measurements comprise received signal strength (RSS) measurements, time of arrival (TOA) measurements, time-difference of arrival measurements (TDOA), or angle of arrival (AOA) measurements.

22. The computer program product according to claim 17, wherein said wireless communications network is an IEEE 802.11 wireless network, a local area network (LAN), the Internet, a mobile telephone system, a GSM mobile telephone system, PCS, a mesh network, an ad hoc network, a 3G mobile phone network, and a 2G mobile phone network.

23. The computer program product according to claim 17, wherein said specified threshold condition for network security is a weighted value, where the weight w applied is dependent upon a location-based parameter where the requesting node is unable to be located.

24. The computer program product according to claim 17, wherein a node comprises an electronic device capable of wireless communications in the wireless communications network.

25. The computer program product according to claim 17, wherein said computer program code means for calculating comprises:
  computer program code means for maintaining a position history for said requesting node and each of one or more existing authorized nodes accessing said wireless communications network; and
  computer program code means for determining an updated position of said requesting node as the position information about said requesting node using said position information about said requesting node derived from said signal measurements for said requesting node received by said at least one existing authorised node in said wireless communications network and the position history for at least one of said requesting node and each such existing authorised node.

26. The computer program product according to claim 25, wherein the updated position of said requesting node is used as the actual position of said requesting node.

27. The computer program product according to claim 25, wherein said determining means uses a filter technique.

28. The computer program product according to claim 27, wherein said filter technique is a particle filter.

29. The computer program product according to claim 17, further comprising computer program code means for measuring signals from said requesting node by said wireless communications network to provide said signal measurements about said requesting node, wherein the fingerprint means RSS values expected from each authorized node at each point in a physical space is a priori measured.

30. The computer program product according to claim 29, further comprising computer program code means for comparing by said wireless communications network said signal measurements against a database of signal measurements based on a wireless device.

31. The computer program product according to claim 29, wherein position information about said requesting node is determined based on a difference of signal measurements for said requesting.

32. The computer program product according to claim 29, wherein at least two access points are in said wireless communications network.

33. The method according to claim 1, wherein said wireless communications network comprises a stand-alone communications unit separate from an access point, or a node, or both, in the wireless communications network.

34. The method according to claim 1, wherein said wireless communications network comprises an access point, or a node, or both, in the wireless communications network.

35. The method according to claim 1, wherein said requesting node, or said authorised node, or both are GPS enabled.

36. The method according to claim 1, further comprising the step of determining by the wireless communications network the radio position of said requesting node using said position information about said requesting node derived from said signal measurements.

37. The method according to claim 1, wherein said wireless communications network comprises a positioning system.

38. The computer program product according to claim 17, wherein said requesting node, or said authorised node, or both are GPS enabled.

39. The computer program product according to claim 17, further comprising computer program code means for determining by the wireless communications network the radio position of said requesting node using said position information about said requesting node derived from said signal measurements.

40. The computer program product according to claim 17, wherein said position information about said requesting node derived from signal measurements comprises Global Positioning System (GPS) information about said requesting node.

41. A system comprising:
an interface for coupling with a wireless communications network;
memory for storing software; and
a processing unit coupled to said interface and said memory for executing said software to provide location enabled security services in said wireless communications network, said memory and said processing unit executing said software implmenting a location engine module and a security permission module;
said location engine module adapted to receive from at least one authorised node of said wireless communications network a network access request from a mobile network node requesting access to said wireless communications network, said wireless communications network having location-positioning capabilities, said authorised and requesting nodes each comprising an electronic device capable of wireless communications in the wireless communications network, said requesting node being adapted to provide to said wireless communications network information for determining the location of said requesting node;
said location engine module adapted to calculate for said wireless communications network a quantitative security value for said requesting node, calculating said quantitative security value comprising:
using position information about said requesting node derived from signal measurements for said requesting node received by at least one existing authorised node in said wireless communications network,
using a different form of position information for claimed position information of said requesting node received by said wireless communications network from said requesting node; and
comparing said claimed position information of said requesting node with an error ellipse on the position of the requesting node; and
said security permission module adapted to deny by said wireless communications network access to said wireless communications network if said quantitative security value does not satisfy a specified threshold value for network security.

42. The system according to claim 41, wherein said interface is a wireless interface.

43. The system according to claim 41, wherein said security permission module is adapted to grant access for said requesting node to said wireless communications network if said quantitative security value does satisfy said specified threshold value.

44. The system according to claim 41, wherein said position information claimed by said requesting node comprises Global Positioning System (GPS) information about said requesting node.

45. The system according to claim 41, wherein said signal measurements comprise received signal strength (RSS) measurements, time of arrival (TOA) measurements, time-difference of arrival measurements (TDOA), or angle of arrival (AOA) measurements.

46. The system according to claim 41, comprising a positioning system to provide positioning information to said memory and said processing unit executing said software.

47. The system according to claim 41, wherein said quantitative security value is calculated based on Cramer-Rao Bounds.

48. The system according to claim 41, wherein said location engine module is adapted to determine by the wireless communications network the radio position of said requesting node using said position information about said requesting node derived from said signal measurements.

49. The system according to claim 41, wherein the wireless communications network is selected from the group consisting of a local area network (LAN), the Internet, an IEEE 802.11 wireless network, a mobile telephone system, a GSM mobile telephone system, PCS, a mesh network, an ad hoc network, a 3G mobile phone network, and a 2G mobile phone network.

50. A method of providing location enabled security services in a wireless communications network, said method comprising the steps of:
receiving by said wireless communications network a network access request from a mobile network node requesting access to said wireless communications network, said wireless communications network having location-positioning capabilities, said requesting node comprising an electronic device capable of wireless communications in the wireless communications network and providing to said wireless communications network information for determining the location of said requesting node;
calculating by said wireless communications network a quantitative security value for said requesting node, said quantitative security value being calculated:
using position information about said requesting node derived from signal measurements for said requesting node received by at least one existing authorised node in said wireless communications network, using a different form of position information for claimed position information of said requesting node received by said wireless communications network from said requesting node, and based on Cramer-Rao Bounds; and denying by said wireless communications network access to said requesting node to said wireless communications network if said quantitative security value does not satisfy a specified threshold value for network security.

51. A computer program product comprising a non-transitory computer readable medium having recorded therein a computer program for providing location enabled security services in a wireless communications network, said computer program product comprising:

computer program code means for receiving by said wireless communications network a network access request from a mobile network node requesting access to said wireless communications network, said wireless communications network having location-positioning capabilities, said requesting node comprising an electronic device capable of wireless communications in the wireless communications network and providing to said wireless communications network information for determining the location of said requesting node;

computer program code means for calculating by said wireless communications network a quantitative security value for said requesting node, said quantitative security value calculated:

using position information about said requesting node derived from signal measurements for said requesting node received by at least one existing authorised node in said wireless communications network, using a different form of position information for claimed position information by said requesting node received by said wireless communications network from said requesting node, and based on Cramer-Rao Bounds; and computer program code means for denying by said wireless communications network access to said wireless communications network if said quantitative security value does not satisfy a specified threshold value for network security.

52. A system comprising:

an interface for coupling with a wireless communications network;

memory for storing software; and a processing unit coupled to said interface and said memory for executing said software to provide location enabled security services in said wireless communications network, said memory and said processing unit executing said software implementing a location engine module and a security permission module;

said location engine module adapted to receive from at least one authorised node of said wireless communications network a network access request from a mobile network node requesting access to said wireless communications network, said wireless communications network having location-positioning capabilities, said authorised and requesting nodes each comprising an electronic device capable of wireless communications in the wireless communications network, said requesting node being adapted to provide to said wireless communications network information for determining the location of said requesting node;

said location engine module adapted to calculate for said wireless communications network a quantitative security value for said requesting node, said quantitative security value calculated:

using position information about said requesting node derived from signal measurements for said requesting node received by at least one existing authorised node in said wireless communications network, using a different form of position information for claimed position information of said requesting node received by said wireless communications network from said requesting node, and based on Cramer-Rao Bounds; and said security permission module adapted to deny by said wireless communications network access to said wireless communications network if said quantitative security value does not satisfy a specified threshold value for network security.

* * * * *